(12) United States Patent
Tang et al.

(10) Patent No.: US 12,400,337 B2
(45) Date of Patent: Aug. 26, 2025

(54) AUTOMATIC EXPOSURE METERING FOR REGIONS OF INTEREST THAT TRACKS MOVING SUBJECTS USING ARTIFICIAL INTELLIGENCE

(71) Applicant: Ambarella International LP, Santa Clara, CA (US)

(72) Inventors: Jian Tang, Shanghai (CN); Tao Liu, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 559 days.

(21) Appl. No.: 17/857,217

(22) Filed: Jul. 5, 2022

(65) Prior Publication Data

US 2023/0419505 A1 Dec. 28, 2023

(30) Foreign Application Priority Data

Jun. 23, 2022 (CN) .......................... 202210725734.0

(51) Int. Cl.
*G06T 7/215* (2017.01)
*G06T 7/246* (2017.01)

(52) U.S. Cl.
CPC .............. *G06T 7/215* (2017.01); *G06T 7/251* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS 11,645,706 B1 * 5/2023 Day ..................... G06V 20/53
    705/307
12,204,543 B2 * 1/2025 Cella .................... G06Q 10/087
    (Continued)

OTHER PUBLICATIONS

Liang et al., "Real Time Scene Change Detection Assisted With Camera 3A (Auto Exposure, Auto White Balance and Auto Focus)," Real-Time Image and Video Processing 2011, edited by Nasser Kehtarnavaz, Matthias F. Carlsohn, Proc. of SPIE-IS&T Electronic Imaging, SPIE vol. 7871, 78710F (Year: 2011).*

(Continued)

*Primary Examiner* — Soo Shin
(74) *Attorney, Agent, or Firm* — Maiorana Patent Law, PA

(57) ABSTRACT

An apparatus comprising an interface and a processor. The interface may be configured to receive pixel data. The processor may be configured to process the pixel data arranged as video frames, generate statistics and a timestamp for the video frames, perform computer vision operations on the video frames to determine one or more regions of interest within the video frames at the timestamp, track a movement of the regions of interest over a sequence of the video frames, evaluate a current luma value of the regions of interest, calculate auto-exposure parameters in response to the current luma value and a target luma value and generate an output signal comprising the auto-exposure parameters. The auto-exposure parameters may be calculated to prioritize an exposure of the regions of interest in the video frames and dynamically change the auto-exposure parameters based on the movement of the regions of interest.

20 Claims, 13 Drawing Sheets

(56) References Cited

U.S. PATENT DOCUMENTS

| | | | | |
|---|---|---|---|---|
| 2008/0068469 | A1* | 3/2008 | Takagi | G11B 27/322 |
| | | | | 348/E5.042 |
| 2019/0361694 | A1* | 11/2019 | Gordon | G06F 9/452 |
| 2023/0164426 | A1* | 5/2023 | Xu | H04N 23/63 |
| | | | | 348/222.1 |
| 2023/0341079 | A1* | 10/2023 | Wang | H04N 23/695 |
| 2024/0249389 | A1* | 7/2024 | Sindhagatta Krishnappa | |
| | | | | G06V 10/764 |
| 2024/0348934 | A1* | 10/2024 | Pan | H04N 23/74 |

OTHER PUBLICATIONS

El-Yamany et al., "Face Skin Tone Adaptive Automatic Exposure Control," https://doi.org/10.2352/ISSN.2470-1173.2019.4.PMII-578, 2019, Society for Imaging Science and Technology, IS&T International Symposium on Electronic Imaging 2019 Photography, Mobile, and Immersive Imaging 2019 (Year: 2019).*

* cited by examiner

AUTOMATIC EXPOSURE METERING FOR REGIONS OF INTEREST THAT TRACKS MOVING SUBJECTS USING ARTIFICIAL INTELLIGENCE

This application relates to China Patent Application No. 202210725734.0, filed on Jun. 23, 2022, which is hereby incorporated by reference in its entirety.

FIELD OF THE INVENTION

The invention relates to video capture generally and, more particularly, to a method and/or apparatus for implementing automatic exposure metering for regions of interest that tracks moving subjects using artificial intelligence.

BACKGROUND

Conventional Automatic Exposure (AE) metering techniques use a static metering weight table. For example, conventional AE metering techniques include spot metering, center metering, average metering, and custom metering (i.e., metering customized by an end user). The static metering weight table used in conventional AE metering is implemented by a predefined table selected from the various metering models. The selected model for the static metering table is used for a luma calculation. The calculated luma value from the static metering table represents the current luminance of the image. The current luminance of the image is used by a 3A technique to determine how the AE is going to be changed.

In a static metering weight table, each number value represents a weight value for a subarea (i.e., a tile) in the image. The luma value of each subarea is scaled up by the corresponding weight value in the static metering weight table. For example, the subarea with a large weight value gets higher priority for exposure than another subarea with a small weight value. If the weight value is equal to zero, then the corresponding subarea will not be taken into account for the luma calculation and will not affect the final AE adjustment.

The static metering weight table design is suitable for exposure on static scenes. However, if a scene includes an interesting moving subject, the static metering weight table model has weaknesses. The weaknesses are caused because the weight value of each subarea is fixed after initialization, and the active subarea (i.e., a non-zero tile) cannot be dynamically changed. For example, for video capture of a person moving from a low weight area into a high weight area, the exposure on the person will be inconsistent (i.e., the person in the image may look dark at first, and then turn to normal exposure as the person moves into the high weight area). In another example, a background might be bright and the subarea of interest might be dark. Even if the subarea of interest is located in a region with high weight tiles, the final average luma will still be affected and averaged by the large luma values from the bright subareas. Using the static metering weight table model, optimal exposure is not achieved.

It would be desirable to implement automatic exposure metering for regions of interest that tracks moving subjects using artificial intelligence.

SUMMARY

The invention concerns an apparatus comprising an interface and a processor. The interface may be configured to receive pixel data. The processor may be configured to process the pixel data arranged as video frames, generate statistics and a timestamp for the video frames, perform computer vision operations on the video frames to determine one or more regions of interest within the video frames at the timestamp, track a movement of the regions of interest over a sequence of the video frames, evaluate a current luma value of the regions of interest, calculate auto-exposure parameters in response to the current luma value and a target luma value and generate an output signal comprising the auto-exposure parameters. The auto-exposure parameters may be calculated to prioritize an exposure of the regions of interest in the video frames. The auto-exposure parameters may be calculated to dynamically change the auto-exposure parameters based on the movement of the regions of interest.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
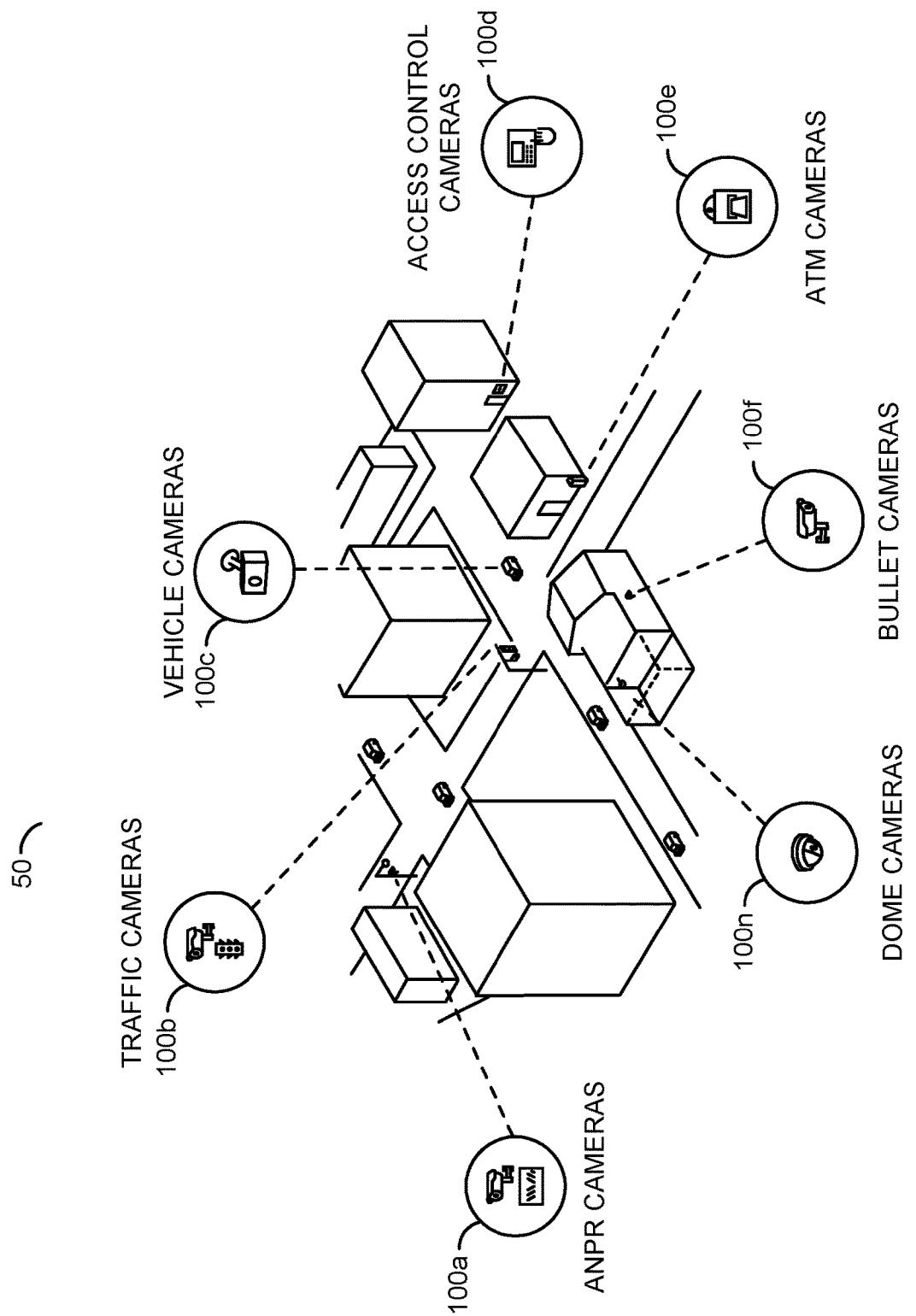
FIG. 1 is a diagram illustrating examples of edge devices that may utilize a processor configured to implement automatic exposure metering for regions of interest that tracks moving subjects using artificial intelligence in accordance with example embodiments of the invention.

Embodiments of the present invention include providing automatic exposure metering for regions of interest that tracks moving subjects using artificial intelligence that may (i) be interoperable with various computer vision techniques, (ii) track an exposure effect for multiple moving regions of interest, (iii) provide accurate and consistent exposure for regions of interest, (iv) be applied to person detection, vehicle detection, motion detection and/or face detection, (v) rank a list of detected regions of interest, (vi) evaluate a current luma value, (vii) calculate auto-exposure parameters to reach a target luma value, (viii) determine luma values based on computer vision results, (ix) prioritize exposure settings for moving objects, (x) classify tiles in a captured image, (xi) switch between metering techniques in response to computer vision results, (xii) predict a location of regions of interest and/or (xiii) be implemented as one or more integrated circuits.

Embodiments of the present invention may be configured to implement an artificial intelligence (AI) based technique in order to determine parameters for automatic exposure (AE) of captured images. Computer vision operations may be implemented in order to track moving subjects in an image using artificial intelligence. The AI based technique for tracking moving objects to determine parameters for AE may enable dynamic adjustments to the metering applied to an image.

Embodiments of the present invention may be configured to be interoperable with various computer vision techniques in order to track an exposure effect on one or more regions of interest (ROI) in video frames. For example, the AI metering technique may be implemented regardless of the particular type of computer vision implemented. For example, the computer vision may be implemented to analyze the region(s) of interest in a video frame and provide the region of interest results for analysis using the AI metering technique. Based on the information about the region(s) of interest in the video frame, the AI metering techniques may be configured to perform accurate and consistent exposure on the region of interest areas.

The AI metering techniques implemented by the embodiments of the present invention may be applicable to various scenarios to ensure sufficient exposure on the ROI areas. For example, implementing the AI metering techniques may ensure that the ROI areas are well exposed to enable further post-processing techniques on the video frames. The AI metering technique may use the information about the detected ROIs to ensure light insensitivity in various lighting conditions. The AI metering technique may be configured to provide accurate and consistent exposure on the ROIs under various light conditions. The computer vision techniques may be implemented to track the ROIs over a sequence of video frames to ensure that the accurate and consistent exposure is applied to the ROIs even as the detected objects corresponding to the ROIs move between dark and light areas in a video frame.

Embodiments of the present invention may be configured to dynamically adjust how the AE is applied to the video frames. In an example, the AE parameters may be selected to ensure consistent exposure for the ROIs when a moving object is detected in the video frames. However, when no ROIs are detected in the video frames, the AI metering technique may be configured to re-calculate the AE parameters in order to apply the exposure to the whole video frame (e.g., provide exposure to the entire image without preferences). For example, the AI metering technique may be suitable for video frames that capture moving objects and/or video frames that capture a static scene.

Embodiments of the present invention may be implemented in a processor implemented by a camera system (e.g., an edge device). In one example, a battery powered camera may implement the processor. The battery powered camera may be implemented on a front door of a home that may capture a static scene (e.g., of the doorstep and the street). Potential moving subjects in the scene may comprise visitors approaching the home. For the home use scenario, users may prefer consistent exposure of visitors instead of having a well-exposed street. The AI metering technique may be configured to provide the consistent and accurate exposure for the visitors.

In some embodiments, the AI metering technique may be implemented by a processor used for a hunting camera. A hunting camera may be installed in a forest to continually look for nearby animals. The static scene may be the forest and the potential moving subjects in the scene may be the animals. For the hunting camera scenario, users may prefer consistent exposure of the animals instead of having a well-exposed forest. The AI metering technique may be configured to provide the consistent and accurate exposure for the animals.

In some embodiments, the AI metering technique may be implemented by a processor used for an access control camera. The access control camera may be placed beside a security door to detect and grant access to authorized people. The static scene may be a doorway and the potential moving subjects in the scene may be people walking through the door. For the access control camera scenario, users may prefer a well-exposed human face instead of having a well-exposed doorway. The AI metering technique may be configured to provide the consistent and accurate exposure for the human faces.

In some embodiments, the AI metering technique may be implemented by a processor used for a traffic violation detection camera. The traffic detection camera may be mounted on an outdoor pole of a traffic light to detect traffic violations by vehicles. The static scene may be the roads, streets, signs, trees and buildings and the potential moving subjects in the scene may be the vehicles. For the traffic detection scenario, user may prefer well-exposed vehicles instead of having the roads, streets, signs, trees and buildings being well-exposed. The AI metering technique may be configured to provide the consistent and best exposure for the vehicles.

In some embodiments, the AI metering technique may be implemented by a processor used for a falling object detection camera. The falling object detection camera may be installed in a first floor of an apartment and/or other high-rise buildings to detect falling objects. The static scene may be the buildings and the potential moving subjects in the scene may be the falling objects. For the falling object scenario, user may prefer well-exposed falling objects instead of having the buildings well-exposed. The AI metering technique may be configured to provide the consistent and best exposure for the falling objects.

In some embodiments, the AI metering technique may be implemented by a processor used for a security camera. The security camera may be mounted on poles or other high locations in a community to detect suspicious vehicles or people. The static scene may be the buildings and streets in the community and the potential moving subjects in the scene may be the pedestrians and vehicles. For the security camera scenario, user may prefer well-exposed pedestrians and vehicles instead of having the buildings and streets being well-exposed. The AI metering technique may be configured to provide the consistent and best exposure for the pedestrians and vehicles.

Embodiments of the present invention may be configured to work in various detection scenarios. In one example, the AI metering technique may be implemented by a camera that may be directed towards a fixed location that may capture moving subjects (e.g., the doorbell camera for visitors). In another example, the AI metering technique may be implemented by a camera that may be moving and directed towards a fixed subject (e.g., a vehicle-mounted camera may move with the vehicle and capture the fixed landscape). In yet another example, the AI metering technique may be implemented by a camera that may be moving and directed towards moving subjects (e.g., a vehicle-mounted camera may move with the vehicle and capture pedestrians and other moving vehicles). Generally, a camera that is moving while capturing subjects that are moving may be the most difficult implementation. Embodiments of the present invention may overcome the difficulties inherent to the moving camera capturing moving subjects by using the ROI prediction based on the consistent relative movement between the camera and the subjects (e.g., the relative movement between the vehicle and the pedestrian).

Embodiments of the present invention may be configured to work with an image sensor, such as an RGB image sensor and/or an RGB-IR sensor. In some embodiments, the AI metering technique may be implemented with a camera system that implements a structured light projector (SLP). However, the AI metering technique may be implemented in cameras that do not implement a SLP. The type of camera implemented and/or the usage scenario for the video capture may be varied according to the design criteria of a particular implementation.

Referring to FIG. 1, a diagram illustrating examples of edge devices that may utilize a processor configured to implement automatic exposure metering for regions of interest that tracks moving subjects using artificial intelligence in accordance with example embodiments of the invention is shown. An overhead view of an area 50 is shown. In the example shown, the area 50 may be an outdoor location. Streets, vehicles and buildings are shown.

Devices 100a-100n are shown at various locations in the area 50. The devices 100a-100n may each implement an edge device. The edge devices 100a-100n may comprise smart IP cameras (e.g., camera systems). The edge devices 100a-100n may comprise low power technology designed to be deployed in embedded platforms at the edge of a network (e.g., microprocessors running on sensors, cameras, or other battery-powered devices), where power consumption is a critical concern. In an example, the edge devices 100a-100n may comprise various traffic cameras and intelligent transportation systems (ITS) solutions.

The edge devices 100a-100n may be implemented for various applications. In the example shown, the edge devices 100a-100n may comprise automated number plate recognition (ANPR) cameras 100a, traffic cameras 100b, vehicle cameras 100c, access control cameras 100d, automatic teller machine (ATM) cameras 100e, bullet cameras 100f, dome cameras 100n, etc. In an example, the edge devices 100a-100n may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 50 may be an outdoor location. In some embodiments, the edge devices 100a-100n may be implemented at various indoor locations. In an example, edge devices 100a-100n may incorporate a convolutional neural network in order to be utilized in security (surveillance) applications and/or access control applications. In an example, the edge devices 100a-100n implemented as security camera and access control applications may comprise battery-powered cameras, doorbell cameras, outdoor cameras, indoor cameras, etc. The security camera and access control applications may realize performance benefits from application of a convolutional neural network in accordance with embodiments of the invention. In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption. The design, type and/or application performed by the edge devices 100a-100n may be varied according to the design criteria of a particular implementation.

Figure 2:
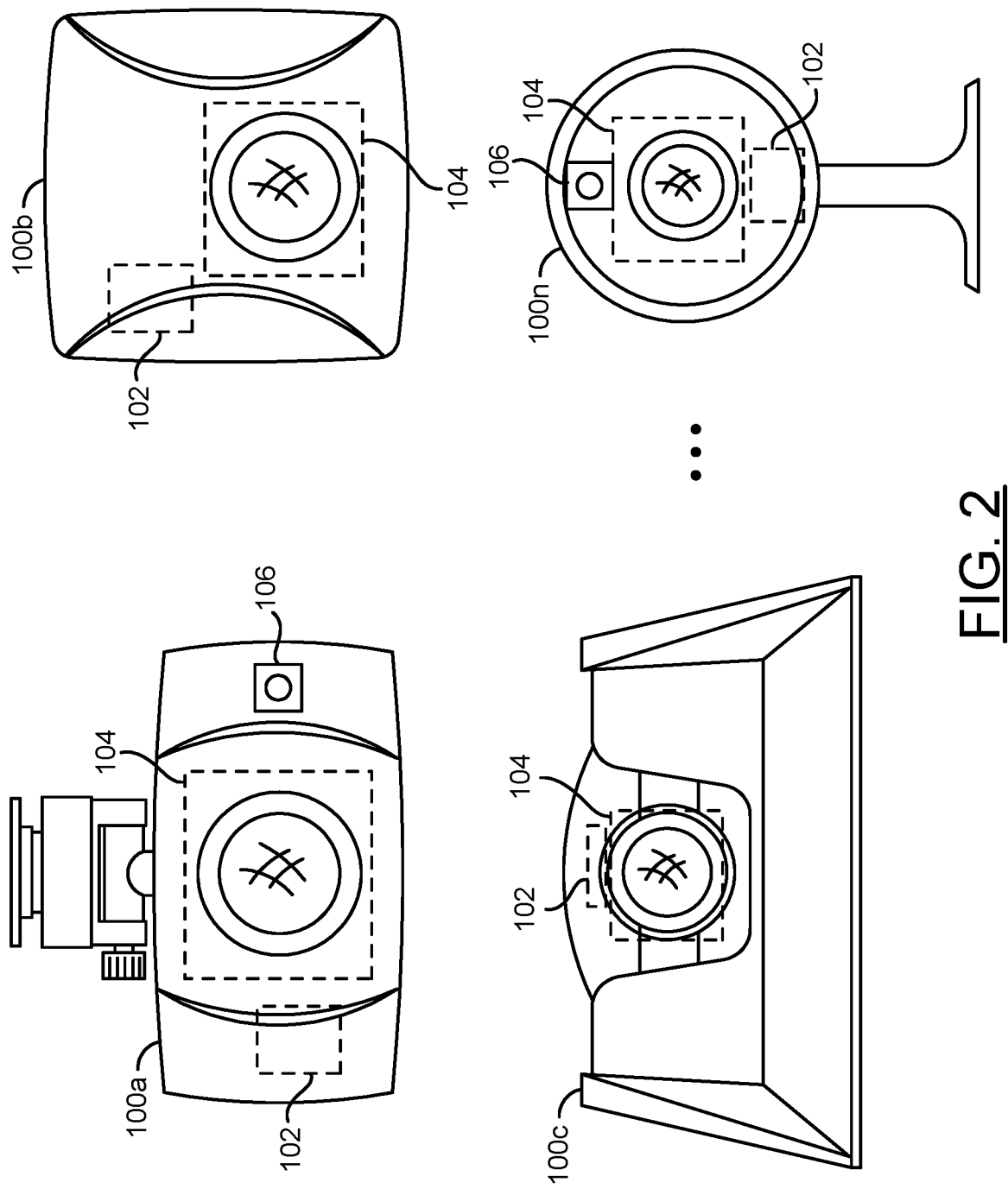
FIG. 2 is a diagram illustrating example cameras implementing an example embodiment of the present invention.

Referring to FIG. 2, a diagram illustrating example edge device cameras implementing an example embodiment of the present invention is shown. The camera systems 100a-100n are shown. Each camera device 100a-100n may have a different style and/or use case. For example, the camera 100a may be an action camera, the camera 100b may be a ceiling mounted security camera, the camera 100n may be a webcam, etc. Other types of cameras may be implemented (e.g., home security cameras, battery powered cameras, doorbell cameras, stereo cameras, etc.). The design/style of the cameras 100a-100n may be varied according to the design criteria of a particular implementation.

Each of the camera systems 100a-100n may comprise a block (or circuit) 102 and/or a block (or circuit) 104. Some of the camera systems 100a-100n may further comprise a block (or circuit) 106. The circuit 102 may implement a processor. The circuit 104 may implement a capture device. The circuit 106 may implement a structured light projector. The camera systems 100a-100n may comprise other components (not shown). Details of the components of the cameras 100a-100n may be described in association with FIG. 3.

The processor 102 may be configured to implement an artificial neural network (ANN). In an example, the ANN may comprise a convolutional neural network (CNN). The processor 102 may be configured to implement a video encoder. The processor 102 may be configured to process the pixel data arranged as video frames. The capture device 104 may be configured to capture pixel data that may be used by the processor 102 to generate video frames. The structured light projector 106 may be configured to generate a structured light pattern (e.g., a speckle pattern). The structured light pattern may be projected onto a background (e.g., the environment). The capture device 104 may capture the pixel data comprising a background image (e.g., the environment) with the speckle pattern.

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), 3D reconstruction, liveness detection, depth map generation, video encoding and/or video transcoding on-device. For example, even advanced processes such as computer vision and 3D reconstruction may be performed by the processor 102 without uploading video data to a cloud service in order to offload computation-heavy functions (e.g., computer vision, video encoding, video transcoding, etc.).

In some embodiments, multiple camera systems may be implemented (e.g., camera systems 100a-100n may operate independently from each other). For example, each of the cameras 100a-100n may individually analyze the pixel data captured and perform the event/object detection locally. In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

The capture device 104 of each of the camera systems 100a-100n may comprise a single lens (e.g., a monocular camera). The processor 102 may be configured to accelerate preprocessing of the speckle structured light for monocular 3D reconstruction. Monocular 3D reconstruction may be performed to generate depth images and/or disparity images without the use of stereo cameras.

In some embodiments, the camera systems 100a-100n may implement multiple capture devices in order to provide stereo vision operations (e.g., depth processing using multiple, similar images). In the example shown, the camera system 100a and the camera system 100n are shown with the structured light projector 106, and the camera system 10b and the camera system 100c are shown without the structured light projector 106. The AI metering technique implemented by the processor 102 of each of the camera systems 100a-100n may be configured to provide functionality with monocular cameras, stereo vision cameras, RGB images (without the structured light projector 106), RGB-IR images (with the structured light projector 106), etc. For generality, the camera system 100a-100n and/or the processor 102 may be described according to embodiments implementing a monocular capture device 104 and without the structured light projector 106. For embodiments, implementing the structured light projector 106, details of the structured light projector 106 may be designed according to the details provided in U.S. patent application Ser. No. 16/520,754, filed on Jul. 24, 2019, U.S. patent application Ser. No. 16/996,114, filed on Aug. 18, 2020, U.S. patent application Ser. No. 17/236,340, filed on Apr. 21, 2021 and U.S. patent application Ser. No. 17/694,726, filed on Mar. 15, 2022, appropriate portions of which are incorporated by reference. However, the processor 102 may be configured to provide the AI metering technique for various types of image sensors and/or cameras according to the design criteria of a particular implementation.

Figure 3:
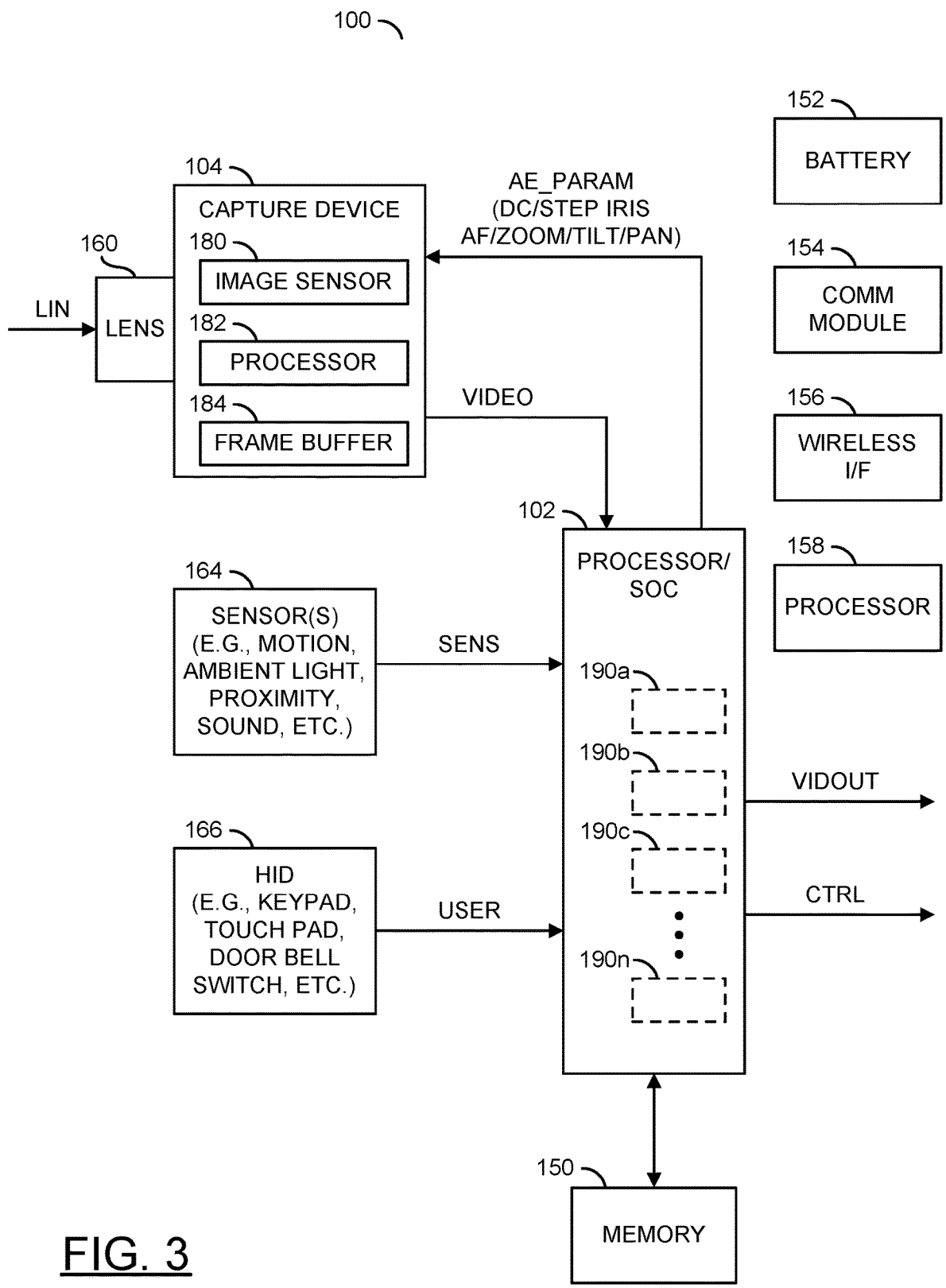
FIG. 3 is a block diagram illustrating a camera system.

Referring to FIG. 3, a block diagram of the camera system 100 is shown illustrating an example implementation. The camera system 100 may be a representative example of the cameras 100a-100n shown in association with FIG. 2. The camera system 100 may comprise the processor/SoC 102, and the capture device 104.

The camera system 100 may further comprise a block (or circuit) 150, a block (or circuit) 152, a block (or circuit) 154, a block (or circuit) 156, a block (or circuit) 158, a block (or circuit) 160, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The circuit 164 may implement one or more sensors. The circuit 166 may implement a human interface device (HID). In some embodiments, the camera system 100 may comprise the processor/SoC 102, the capture device 104, the memory 150, the lens 160, the sensors 164, the battery 152, the communication module 154, the wireless interface 156 and the processor 158. In another example, the camera system 100 may comprise the processor/SoC 102, the capture device 104, the processor 158, the lens 160, and the sensors 164 as one device, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

The processor 102 may be implemented as a video processor. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames.

The memory 150 may store data. The memory 150 may implement various types of memory including, but not limited to, a cache, flash memory, memory card, random access memory (RAM), dynamic RAM (DRAM) memory, etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets and/or metadata information. In some embodiments, the memory 150 may store reference images. The reference images may be used for computer vision operations, 3D reconstruction, auto-exposure, etc. In some embodiments, the reference images may comprise reference structured light images.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, liveness detection CNN, etc.) stored in the memory 150. In an example, the memory 150 may store one or more directed acyclic graphs (DAGs) and one or more sets of weights and biases defining the one or more artificial neural network models. The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. The dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

In some embodiments, the communications module 154 and/or the wireless interface 156 may be configured to receive user input. The user input may enable a user to adjust operating parameters for various features implemented by the processor 102. In some embodiments, the communications module 154 and/or the wireless interface 156 may be configured to interface (e.g., using an application programming interface (API) with an application (e.g., an app). For example, the app may be implemented on a smartphone to enable an end user to adjust various settings and/or parameters for the various features implemented by the processor 102 (e.g., set video resolution, select frame rate, select output format, set tolerance parameters for 3D reconstruction, etc.).

The processor 158 may be implemented using a general purpose processor circuit. The processor 158 may be operational to interact with the video processing circuit 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). Which of the functionality of the camera system 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the camera system 100 (e.g., a view for a video frame, a view for a panoramic video frame captured using multiple camera systems 100a-100n, a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

In an example, the capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. The signal VIDEO may be images comprising a background (e.g., the environment captured) and various subjects. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be configured to generate an RGB video signal, an IR video signal and/or an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The capture device 104 may be configured to receive a signal (e.g., AE_PARAM). The signal AE_PARAM may be generated by the processor 102. The signal AE_PARAM may comprise auto exposure parameters generated by the AI metering technique implemented by the processor 102. The processor/logic 182 may be configured to adjust operating parameters of the capture device 104 in response to the signal AE_PARAM. In an example, the processor/logic 182 may adjust an exposure of the image sensor 180 in response to the signal AE_PARAM. In another example, the processor/logic 182 may adjust a DC iris and/or a shutter time for the image sensor 180 in response to the signal AE_PARAM. In yet another example, the processor/logic 182 may adjust a zoom/tilt/pan/focus of the capture device 104 in response to the signal AE_PARAM. In still another example, the processor/logic 182 may adjust the automatic gain control (AGC) of the image sensor 180 in response to the signal AE_PARAM. In some embodiments, the signal AE_PARAM may be configured to provide an activation and/or wakeup signal to the capture device 104. The types of adjustments made in response to the signal AE_PARAM to adjust an exposure, focus and/or capture direction of the capture device 104 may be varied according to the design criteria of a particular implementation.

The sensors 164 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 104. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. The HID 166 may generate a signal (e.g., USER). The signal USER may provide the input received by the HID 166 to the processor 102. The signal USER may comprise the human input. In one example, the HID 166 may be configured to receive a password input from a user. In another example, the HID 166 may be configured to receive user input in order to provide various parameters and/or settings to the processor 102 and/or the memory 150. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication.

The processor/SoC 102 may receive the signal VIDEO, the signal SENS and/or the signal USER. The processor/SoC 102 may generate one or more video output signals (e.g., VIDOUT) and/or one or more control signals (e.g., CTRL) based on the signal VIDEO, the signal SENS, the signal USER and/or other input. In some embodiments, the signals VIDOUT and CTRL may be generated based on analysis of the signal VIDEO and/or objects detected in the signal VIDEO.

In various embodiments, the processor/SoC 102 may be configured to perform one or more of feature extraction, object detection, object tracking, 3D reconstruction, liveness detection and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data and/or the depth data signal comprising disparity maps and depth maps from the signal VIDEO. The video output signal VIDOUT and/or the depth data may be presented to the memory 150, the communications module 154, and/or the wireless interface 156. In some embodiments, the video signal VIDOUT and/or the depth data may be used internally by the processor 102 (e.g., not presented as output).

The signal VIDOUT may be presented to the communication device 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VIDOUT may be data generated by the processor 102 (e.g., video analysis results, audio/speech analysis results, etc.) that may be communicated to a cloud computing service in order to aggregate information and/or provide training data for machine learning (e.g., to improve object detection, to improve audio detection, to improve liveness detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operations of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The signal CTRL may be generated in response to user input in order to provide various parameters and/or settings to the processor 102 and/or the memory 150. The processor 102 may be configured to generate the signal CTRL in response to sensor fusion operations (e.g., aggregating information received from disparate sources). The processor 102 may be configured to generate the signal CTRL in response to results of liveness detection performed by the processor 102. The conditions for generating the signal CTRL may be varied according to the design criteria of a particular implementation.

The multi-step approach to activating and/or disabling the capture device 104 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 104, the memory 150, the communications module 154, etc.) may be off. In another example, the camera system 100 may operate in an intermediate state. In the intermediate state, the image capture device 104 may be on and the memory 150 and/or the communications module 154 may be off. In yet another example, the camera system 100 may operate in a power-on (or high power) state. In the power-on state, the sensors 164, the processor/SoC 102, the capture device 104, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded, video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline. The circuits 190a-190n may be configured to receive the pixel data VIDEO, generate the video frames from the pixel data, perform various operations on the video frames (e.g., de-warping, rolling shutter correction, cropping, upscaling, image stabilization, 3D reconstruction, liveness detection, auto-exposure, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190a-190n may be configured to implement various security features (e.g., secure boot, I/O virtualization, etc.). Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020, U.S. patent application Ser. No. 16/288,922, filed on Feb. 28, 2019, U.S. patent application Ser. No. 15/593,493 (now U.S. Pat. No. 10,437,600), filed on May 12, 2017, U.S. patent application Ser. No. 15/931,942, filed on May 14, 2020, U.S. patent application Ser. No. 16/991,344, filed on Aug. 12, 2020, U.S. patent application Ser. No. 17/479,034, filed on Sep. 20, 2021, appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, 3D reconstruction, depth map generation, liveness detection, etc.) to be performed locally by the camera system 100.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190b may implement a convolutional neural network (CNN) module. The CNN module 190b may be configured to perform the computer vision operations on the video frames. The CNN module 190b may be configured to implement recognition of objects through multiple layers of feature detection. The CNN module 190b may be configured to calculate descriptors based on the feature detection performed. The descriptors may enable the processor 102 to determine a likelihood that pixels of the video frames correspond to particular objects (e.g., a particular make/model/year of a vehicle, identifying a person as a particular individual, detecting a type of animal, detecting characteristics of a face, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190*b* may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190*b* to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190*b* using dedicated hardware circuitry may enable calculating descriptor matching distances in real time.

The CNN module 190*b* may be configured to perform face detection, face recognition and/or liveness judgment. For example, face detection, face recognition and/or liveness judgment may be performed based on a trained neural network implemented by the CNN module 190*b*. In some embodiments, the CNN module 190*b* may be configured to generate the depth image from the structured light pattern. The CNN module 190*b* may be configured to perform various detection and/or recognition operations and/or perform 3D recognition operations.

The CNN module 190*b* may be a dedicated hardware module configured to perform feature detection of the video frames. The features detected by the CNN module 190*b* may be used to calculate descriptors. The CNN module 190*b* may determine a likelihood that pixels in the video frames belong to a particular object and/or objects in response to the descriptors. For example, using the descriptors, the CNN module 190*b* may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190*b* as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190*b* may be configured to perform the feature detection on the video frames in order to generate the descriptors. The CNN module 190*b* may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190*b* may be configured to perform local masking to the region with the high likelihood of matching the particular object(s) to detect the object.

In some embodiments, the CNN module 190*b* may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190*b* may be pre-trained (e.g., configured to perform computer vision to detect objects based on the training data received to train the CNN module 190*b*). For example, the results of training data (e.g., a machine learning model) may be pre-programmed and/or loaded into the processor 102. The CNN module 190*b* may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190*b* may be varied according to the design criteria of a particular implementation.

The CNN module 190*b* may implement the feature extraction and/or object detection by performing convolution operations. The convolution operations may be hardware accelerated for fast (e.g., real-time) calculations that may be performed while consuming low power. In some embodiments, the convolution operations performed by the CNN module 190*b* may be utilized for performing the computer vision operations. In some embodiments, the convolution operations performed by the CNN module 190*b* may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190*b* may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190*b* may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190*b* to extract features from the training data may be varied according to the design criteria of a particular implementation.

Each of the hardware modules 190*a*-190*n* may implement a processing resource (or hardware resource or hardware engine). The hardware engines 190*a*-190*n* may be operational to perform specific processing tasks. In some configurations, the hardware engines 190*a*-190*n* may operate in parallel and independent of each other. In other configurations, the hardware engines 190*a*-190*n* may operate collectively among each other to perform allocated tasks. One or more of the hardware engines 190*a*-190*n* may be homogenous processing resources (all circuits 190*a*-190*n* may have the same capabilities) or heterogeneous processing resources (two or more circuits 190*a*-190*n* may have different capabilities).

Figure 4:
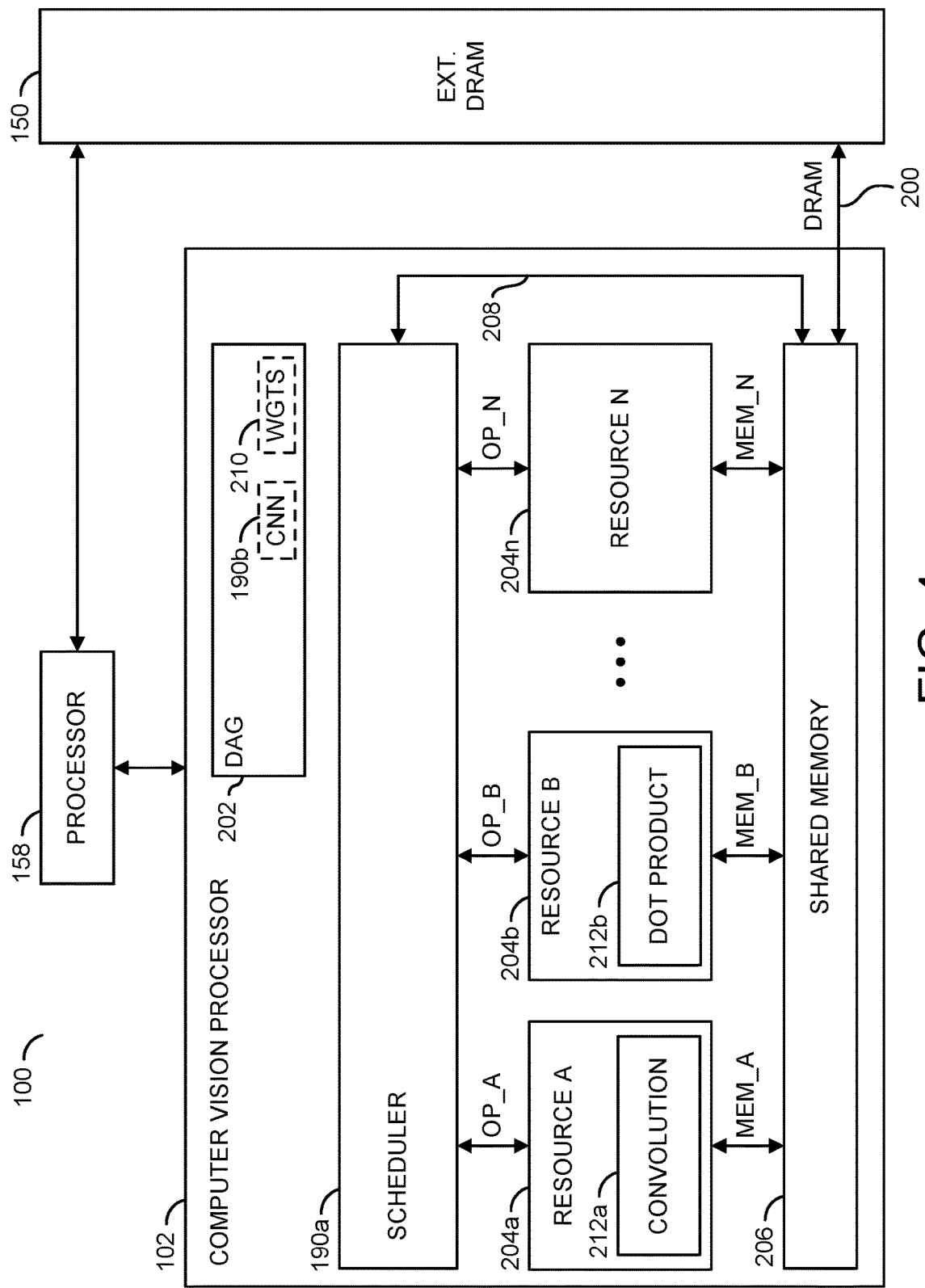
FIG. 4 is a diagram illustrating processing circuitry of a camera system implementing a convolutional neural network configured to perform object tracking and ranking.

Referring to FIG. 4, a diagram illustrating processing circuitry of a camera system implementing a convolutional neural network configured to perform object tracking and ranking is shown. In an example, processing circuitry of the camera system 100 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuitry of the camera system 100 generally comprises hardware circuitry that is optimized to provide a high performance image processing and computer vision pipeline in a minimal area and with minimal power consumption. In an example, various operations used to perform image processing, feature detection/extraction, 3D reconstruction, liveness detection, depth map generation and/or object detection/classification for computer (or machine) vision may be implemented using hardware modules designed to reduce computational complexity and use resources efficiently.

In an example embodiment, the processing circuit 100 may comprise the processor 102, the memory 150, the general purpose processor 158 and/or a memory bus 200. The general purpose processor 158 may implement a first processor. The processor 102 may implement a second processor. In an example, the circuit 102 may implement a computer vision processor. In an example, the processor 102 may be an intelligent vision processor. The memory 150 may implement an external memory (e.g., a memory external to the circuits 158 and 102). In an example, the circuit 150 may be implemented as a dynamic random access memory (DRAM) circuit. The processing circuitry of the camera system 100 may comprise other components (not shown). The number, type and/or arrangement of the components of the processing circuitry of the camera system 100 may be varied according to the design criteria of a particular implementation.

The general purpose processor 158 may be operational to interact with the circuit 102 and the circuit 150 to perform various processing tasks. In an example, the processor 158 may be configured as a controller for the circuit 102. The processor 158 may be configured to execute computer readable instructions. In one example, the computer readable instructions may be stored by the circuit 150. In some embodiments, the computer readable instructions may comprise controller operations. The processor 158 may be configured to communicate with the circuit 102 and/or access results generated by components of the circuit 102. In an example, the processor 158 may be configured to utilize the circuit 102 to perform operations associated with one or more neural network models.

In an example, the processor 102 generally comprises the scheduler circuit 190*a*, a block (or circuit) 202, one or more blocks (or circuits) 204*a*-204*n*, a block (or circuit) 206 and a path 208. The block 202 may implement a directed acyclic graph (DAG) memory. The DAG memory 202 may comprise the CNN module 190*b* and/or weight/bias values 210. The blocks 204*a*-204*n* may implement hardware resources (or engines). The block 206 may implement a shared memory circuit. In an example embodiment, one or more of the circuits 204*a*-204*n* may comprise blocks (or circuits) 212*a*-212*n*. In the example shown, the circuit 212*a* and the circuit 212*b* are implemented as representative examples in the respective hardware engines 204*a*-204*b*. One or more of the circuit 202, the circuits 204*a*-204*n* and/or the circuit 206 may be an example implementation of the hardware modules 190*a*-190*n* shown in association with FIG. 3.

In an example, the processor 158 may be configured to program the circuit 102 with one or more pre-trained artificial neural network models (ANNs) including the convolutional neural network (CNN) 190*b* having multiple output frames in accordance with embodiments of the invention and weights/kernels (WGTS) 210 utilized by the CNN module 190*b*. In various embodiments, the CNN module 190*b* may be configured (trained) for operation in an edge device. In an example, the processing circuitry of the camera system 100 may be coupled to a sensor (e.g., video camera, etc.) configured to generate a data input. The processing circuitry of the camera system 100 may be configured to generate one or more outputs in response to the data input from the sensor based on one or more inferences made by executing the pre-trained CNN module 190*b* with the weights/kernels (WGTS) 210. The operations performed by the processor 158 may be varied according to the design criteria of a particular implementation.

In various embodiments, the circuit 150 may implement a dynamic random access memory (DRAM) circuit. The circuit 150 is generally operational to store multidimensional arrays of input data elements and various forms of output data elements. The circuit 150 may exchange the input data elements and the output data elements with the processor 158 and the processor 102.

The processor 102 may implement a computer vision processor circuit. In an example, the processor 102 may be configured to implement various functionality used for computer vision. The processor 102 is generally operational to perform specific processing tasks as arranged by the processor 158. In various embodiments, all or portions of the processor 102 may be implemented solely in hardware. The processor 102 may directly execute a data flow directed to execution of the CNN module 190b, and generated by software (e.g., a directed acyclic graph, etc.) that specifies processing (e.g., computer vision, 3D reconstruction, liveness detection, etc.) tasks. In some embodiments, the processor 102 may be a representative example of numerous computer vision processors implemented by the processing circuitry of the camera system 100 and configured to operate together.

In an example, the circuit 212a may implement convolution operations. In another example, the circuit 212b may be configured to provide dot product operations. The convolution and dot product operations may be used to perform computer (or machine) vision tasks (e.g., as part of an object detection process, etc.). In yet another example, one or more of the circuits 204c-204n may comprise blocks (or circuits) 212c-212n (not shown) to provide convolution calculations in multiple dimensions. In still another example, one or more of the circuits 204a-204n may be configured to perform 3D reconstruction tasks.

In an example, the circuit 102 may be configured to receive directed acyclic graphs (DAGs) from the processor 158. The DAGs received from the processor 158 may be stored in the DAG memory 202. The circuit 102 may be configured to execute a DAG for the CNN module 190b using the circuits 190a, 204a-204n, and 206.

Multiple signals (e.g., OP_A-OP_N) may be exchanged between the circuit 190a and the respective circuits 204a-204n. Each of the signals OP_A-OP_N may convey execution operation information and/or yield operation information. Multiple signals (e.g., MEM_A-MEM_N) may be exchanged between the respective circuits 204a-204n and the circuit 206. The signals MEM_A-MEM_N may carry data. A signal (e.g., DRAM) may be exchanged between the circuit 150 and the circuit 206. The signal DRAM may transfer data between the circuits 150 and 190a (e.g., on the transfer path 208).

The scheduler circuit 190a is generally operational to schedule tasks among the circuits 204a-204n to perform a variety of computer vision related tasks as defined by the processor 158. Individual tasks may be allocated by the scheduler circuit 190a to the circuits 204a-204n. The scheduler circuit 190a may allocate the individual tasks in response to parsing the directed acyclic graphs (DAGs) provided by the processor 158. The scheduler circuit 190a may time multiplex the tasks to the circuits 204a-204n based on the availability of the circuits 204a-204n to perform the work.

Each circuit 204a-204n may implement a processing resource (or hardware engine). The hardware engines 204a-204n are generally operational to perform specific processing tasks. The hardware engines 204a-204n may be implemented to include dedicated hardware circuits that are optimized for high-performance and low power consumption while performing the specific processing tasks. In some configurations, the hardware engines 204a-204n may operate in parallel and independent of each other. In other configurations, the hardware engines 204a-204n may operate collectively among each other to perform allocated tasks.

The hardware engines 204a-204n may be homogenous processing resources (e.g., all circuits 204a-204n may have the same capabilities) or heterogeneous processing resources (e.g., two or more circuits 204a-204n may have different capabilities). The hardware engines 204a-204n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In an example, the hardware engines 204a-204n may comprise matrices stored in various memory buffers. The matrices stored in the memory buffers may enable initializing the convolution operator. The convolution operator may be configured to efficiently perform calculations that are repeatedly performed for convolution functions. In an example, the hardware engines 204a-204n implementing the convolution operator may comprise multiple mathematical circuits configured to handle multi-bit input values and operate in parallel. The convolution operator may provide an efficient and versatile solution for computer vision and/or 3D reconstruction by calculating convolutions (also called cross-correlations) using a one-dimensional or higher-dimensional kernel. The convolutions may be useful in computer vision operations such as object detection, object recognition, edge enhancement, image smoothing, etc. Techniques and/or architectures implemented by the invention may be operational to calculate a convolution of an input array with a kernel. Details of the convolution operator may be described in association with U.S. Pat. No. 10,310,768, filed on Jan. 11, 2017, appropriate portions of which are hereby incorporated by reference.

In various embodiments, the hardware engines 204a-204n may be implemented solely as hardware circuits. In some embodiments, the hardware engines 204a-204n may be implemented as generic engines that may be configured through circuit customization and/or software/firmware to operate as special purpose machines (or engines). In some embodiments, the hardware engines 204a-204n may instead be implemented as one or more instances or threads of program code executed on the processor 158 and/or one or more processors 102, including, but not limited to, a vector processor, a central processing unit (CPU), a digital signal processor (DSP), or a graphics processing unit (GPU). In some embodiments, one or more of the hardware engines 204a-204n may be selected for a particular process and/or thread by the scheduler 190a. The scheduler 190a may be configured to assign the hardware engines 204a-204n to particular tasks in response to parsing the directed acyclic graphs stored in the DAG memory 202.

The circuit 206 may implement a shared memory circuit. The shared memory 206 may be configured to store data in response to input requests and/or present data in response to output requests (e.g., requests from the processor 158, the DRAM 150, the scheduler circuit 190a and/or the hardware engines 204a-204n). In an example, the shared memory circuit 206 may implement an on-chip memory for the computer vision processor 102. The shared memory 206 is generally operational to store all of or portions of the multidimensional arrays (or vectors) of input data elements and output data elements generated and/or utilized by the hardware engines 204a-204n. The input data elements may be transferred to the shared memory 206 from the DRAM circuit 150 via the memory bus 200. The output data elements may be sent from the shared memory 206 to the DRAM circuit 150 via the memory bus 200.

The path 208 may implement a transfer path internal to the processor 102. The transfer path 208 is generally operational to move data from the scheduler circuit 190a to the shared memory 206. The transfer path 208 may also be operational to move data from the shared memory 206 to the scheduler circuit 190a.

The processor 158 is shown communicating with the computer vision processor 102. The processor 158 may be configured as a controller for the computer vision processor 102. In some embodiments, the processor 158 may be configured to transfer instructions to the scheduler 190a. For example, the processor 158 may provide one or more directed acyclic graphs to the scheduler 190a via the DAG memory 202. The scheduler 190a may initialize and/or configure the hardware engines 204a-204n in response to parsing the directed acyclic graphs. In some embodiments, the processor 158 may receive status information from the scheduler 190a. For example, the scheduler 190a may provide a status information and/or readiness of outputs from the hardware engines 204a-204n to the processor 158 to enable the processor 158 to determine one or more next instructions to execute and/or decisions to make. In some embodiments, the processor 158 may be configured to communicate with the shared memory 206 (e.g., directly or through the scheduler 190a, which receives data from the shared memory 206 via the path 208). The processor 158 may be configured to retrieve information from the shared memory 206 to make decisions. The instructions performed by the processor 158 in response to information from the computer vision processor 102 may be varied according to the design criteria of a particular implementation.

Figure 5:
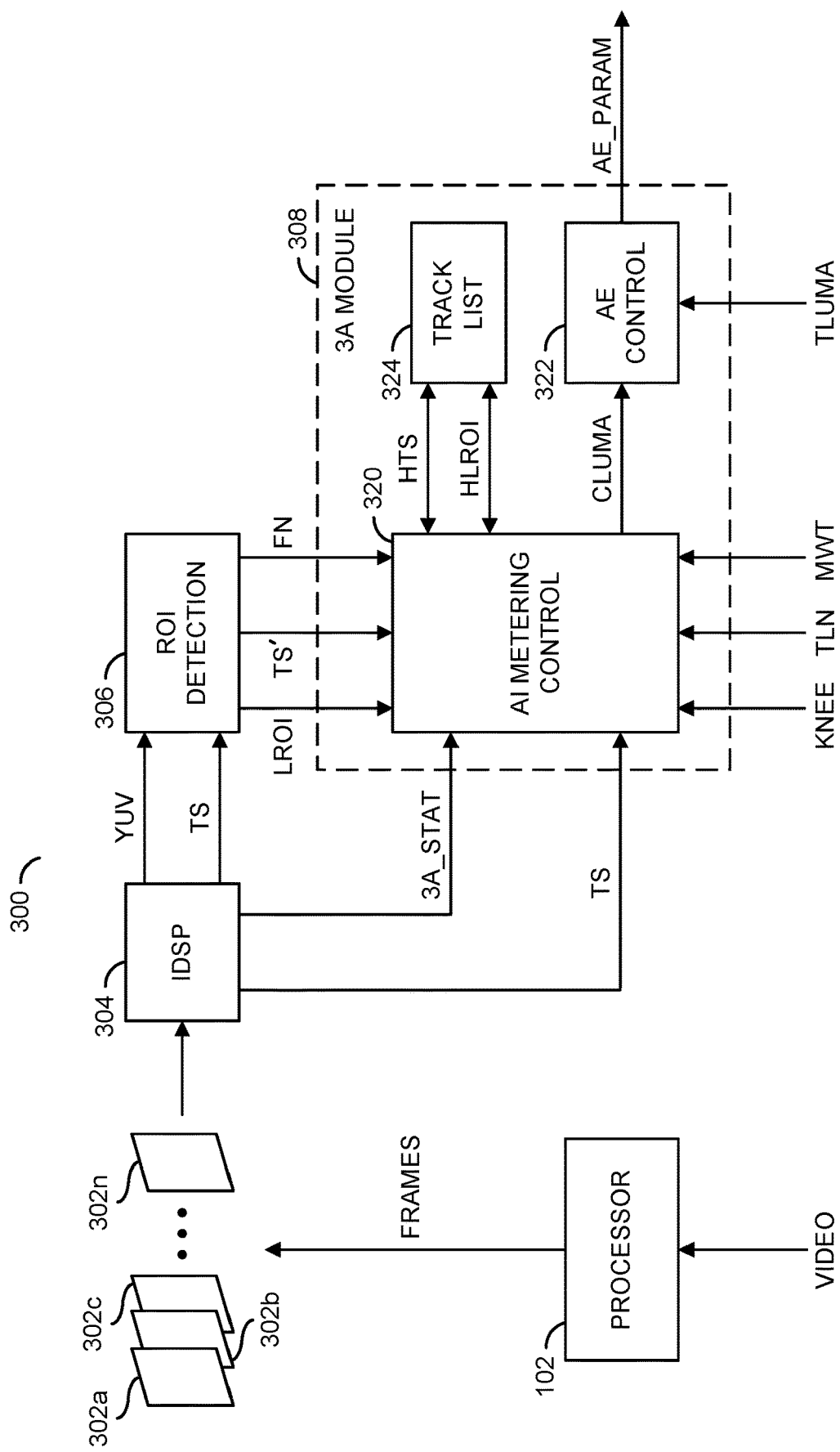
FIG. 5 is a block diagram illustrating an intelligent auto-exposure metering system.

Referring to FIG. 5, a block diagram illustrating an intelligent auto-exposure metering system is shown. Dynamic AI metering components 300 are shown. The dynamic AI metering components 300 may comprise various hardware, conceptual blocks, inputs and/or outputs that may be used by the apparatus 100 to perform the AI metering technique for auto-exposure. The dynamic AI metering components 300 may be represented as a block diagram that illustrates the operations performed by the apparatus 100 to determine regions of interest (ROI) for the various subjects and/or generate the AE parameters.

The dynamic AI metering components 300 may comprise the processor 102, video frames 302a-302n, a block (or circuit) 304, a block (or circuit) 306 and/or a block (or circuit) 308. The circuit 304 may implement an image digital signal processor (IDSP). The circuit 306 may implement a region of interest detection module. The circuit 308 may implement a 3A module. The processor 102, the IDSP 304, the ROI detection module 306 and the 3A module 308 are shown as separate components for illustrative purposes. However, the IDSP 304, the ROI detection module 306 and the 3A module 308 may each be components implemented by the processor 102. The dynamic AI metering components 300 may comprise other components (not shown). The number, type and/or arrangement of the components of the dynamic AI metering components 300 may be varied according to the design criteria of a particular implementation.

The processor 102 may be configured to receive the signal VIDEO. The signal VIDEO may comprise the RGB pixel data generated by the image sensor 180. The pixel data may comprise information captured of the environment and/or objects near the capture device 104. In some embodiments, the pixel data may comprise RGB data along with the structured light pattern projected onto the environment and/or objects. The processor 102 may generate a signal (e.g., FRAMES). The signal FRAMES may comprise the video frames 302a-302n. The processor 102 may be configured to process the pixel data arranged as the video frames 302a-302n. The video frames 302a-302n may be presented to (e.g., processed internally by the processor 102 using) the CNN module 190b. The processor 102 may be capable of performing other operations using the video frames 302a-302n (e.g., generate encoded video frames for display, packetize the video frames 302a-302n for communication using the communication module 154, etc.).

The IDSP 304 may be configured to receive the video frames 302a-302n. The IDSP 304 may be configured to process the raw video frames 302a-302n one frame at a time. The IDSP 304 may be configured to generate a signal (e.g., TS), a signal (e.g., 3A_STAT) and/or a signal (e.g., YUV). The signal TS may comprise a timestamp of one of the video frames 302a-302n being processed by the ID SP 304. The signal 3A_STAT may comprise 3A statistics generated by the IDSP 304 in response to one of the video frames 302a-302n. The signal YUV may comprise the YUV images extracted by the IDSP 304 from one of the video frames 302a-302n. The IDSP 304 may be configured to generate and/or receive other data (not shown). The number and/or type of data input received by and/or data output generated by the IDSP 304 may be varied according to the design criteria of a particular implementation.

The timestamp signal TS and the statistics signal 3A_STAT may be extracted and/or generated in response to analyzing the video frames 302a-302n one at a time. The 3A statistics may be output data from the IDSP 304 that may comprise multiple entries of data such as luma and/or histograms. For example, the table of tile luma values may be one of the data entries from the 3A statistics. In another example, the 3A statistics may comprise information about auto-white balance, auto-focus and auto-exposure. The 3A statistics may comprise a luma value for each tile with a value range of [0, 4095], inclusive. The timestamp signal TS and the statistics signal 3A_STAT may be presented to the 3A module 308. The IDSP 304 may be configured to forward the YUV image to the ROI detection module 306 along with the timestamp signal TS.

The ROI detection module 306 may be a component of the CNN module 190b. The ROI detection module 306 may be configured to perform various computer vision operations on the YUV images generated from the video frames 302a-302n. The ROI detection module 306 may receive the timestamp signal TS and the signal YUV. The ROI detection module 306 may be configured to generate a signal (e.g., TS'), a signal (e.g., FN) and a signal (e.g., LROI). The signal TS' may comprise an updated timestamp. The signal FN may comprise a frame number of the one of the video frames 302a-302n analyzed by the ROI detection module 306. In some embodiments, the YUV images may be communicated with the signal FN. The signal LROI may comprise a list of entries of regions of interest and/or information about the regions of interest. The updated timestamp signal TS', the frame number signal FN and/or the signal LROI may be generated by the ROI detection module 306 in response to the timestamp signal TS and/or the signal YUV. The updated timestamp signal TS', the frame number signal FN and/or the signal LROI may be presented to the 3A module 308. The number and/or type of data input received by and/or data output generated by the ROI detection module 306 may be varied according to the design criteria of a particular implementation.

The ROI detection module 306 may be configured to implement one or more computer vision AI models. The computer vision AI models may be configured to detect various objects, subjects and/or events of interest in the YUV images generated from the video frames 302a-302n. The computer vision AI model(s) implemented by the ROI detection module 306 may be configured to detect and/or classify one or more types of objects. In one example, the computer vision AI model implemented by the ROI detection module 306 may be configured to perform person detection. In another example, the computer vision AI model implemented by the ROI detection module 306 may be configured to perform vehicle detection. In yet another example, the computer vision AI model implemented by the ROI detection module 306 may be configured to motion detection. In still another example, face detection. In some embodiments, the computer vision AI models implemented by the ROI detection module 306 may be configured to perform a combination of various subject detection (e.g., detect pedestrians and vehicles). The number of computer vision AI models and/or the types of objects detected as regions of interest in the YUV images of the video frames 302a-302n may be varied according to the design criteria of a particular implementation.

The ROI detection module 306 may be configured to calculate each of the ROIs within the YUV image of one of the video frames 302a-302n at a time. The ROI detection module 306 may be configured to generate the timestamp (e.g., a modified timestamp) for the analyzed YUV image of one of the video frames 302a-302n. The ROI detection module 306 may be configured to generate the frame number for the analyzed YUV image of one of the video frames 302a-302n. The ROI information calculated may comprise a list of regions of interest (e.g., a list of each ROI calculated corresponding to each object/subject). The list of ROIs may comprise multiple entries and/or elements (e.g., subjects), a single element/entry or even zero elements (e.g., no objects of interest detected). The ROI information for each of the ROIs calculated in the ROI list may comprise a ROI position (e.g., an x,y coordinate in the YUV image), a ROI ID and/or an ROI weight. For example, the signal LROI may comprise the list of ROIs detected comprising the ROI position, the ROI ID and the ROI weight for each ROI.

The ROI position may define a start and end point of a region of interest area in the YUV image. For example, the ROI position may comprise x,y coordinates that define a bounding box for the detected subject. The size of the ROI position may depend on the size of the object detected with respect to the size of the YUV image.

The ROI ID may comprise a unique number. The unique number for the ROI ID may be assigned to each ROI in order to uniquely identify the detected object. The ROI ID may be used to enable the processor 102 to track the same objects between one or more of the video frames 302a-302n. Each unique object detected may share the same ROI ID between the video frames 302a-302n frames, and different objects may each have different ROI ID numbers assigned by the ROI detection module 306.

The ROI weight may comprise a floating value number. In an example, the ROI weight may comprise a value between 0.0 to 1.0, inclusive. The ROI weight may be applied to each ROI area. The ROI weight may specify a priority for each ROI. The priority may be used to determine which of the ROIs may be preferred in terms of best exposure. For example, the ROI with the highest ROI weight may receive the highest priority in terms of exposure while the ROI with the lowest ROI weight may receive the lowest priority. The sum of the ROI weight for all ROIs may not exceed 1.0. The amount of ROI weight to apply to each object/subject detected may be determined by the computer vision AI model(s) implemented. In some embodiments, the computer vision AI model implemented may detect people, faces and vehicles and the computer vision AI model may be configured to provide the highest ROI weight to the faces, then to the people and then to the vehicles (e.g., to ensure that faces may be identifiable for facial recognition, while still providing exposure for other objects of interest such as vehicles). The amount of ROI weight to apply to each of the ROIs may be varied according to the design criteria of a particular implementation.

The modified (or updated) timestamp generated by the ROI detection module 306 (e.g., the modified timestamp signal TS') may be generated based on the timestamp (e.g., the timestamp signal TS) of the YUV image for one of the video frames 302a-302n. For example, the YUV image may be assigned the timestamp from the timestamp signal TS received from the IDSP module 304. Generally the modified timestamp signal TS' generated by the ROI detection module 306 may be different from the latest timestamp in the timestamp signal TS. For example, the computer vision analysis performed by the ROI detection module 306 may take a small amount of time to complete. The ROI detection module 306 may perform the analysis for one YUV image from the video frames 302a-302n (e.g., the video frame 302a) while the IDSP 304 provides the next YUV image with a new timestamp from the video frames 302a-302n (e.g., the video frame 302b). If the computer vision operations performed by the ROI detection module 306 are capable of being performed before the next video frame is received, then the signal TS' may comprise a timestamp that equals the value of the input timestamp TS. The difference between value in the signal TS and the value in the output modified signal TS' may depend on the calculation speed of computer vision operations performed by the ROI detection module 306.

The 3A module 308 may be configured to receive the timestamp signal TS, the statistics signal 3A_STAT, the modified timestamp signal TS', the frame number signal FN, the signal LROI, a signal (e.g., KNEE), a signal (e.g., TLN), a signal (e.g., MWT) and/or a signal (e.g., TLUMA). The 3A module 308 may be configured to generate the parameters signal AE_PARAM. The signal AE_PARAM may be presented to the capture device 104. The number and/or type of data input received by and/or data output generated by the 3A module 308 may be varied according to the design criteria of a particular implementation.

The 3A module 308 may comprise a block (or circuit) 320, a block (or circuit) 322 and/or a block (or circuit) 324. The circuit 320 may implement an AI metering control module. The circuit 322 may implement an auto-exposure (AE) control module. The circuit 324 may implement a track list queue. The 3A module 308 may comprise other components (not shown). The number, type and/or arrangement of the components of the 3A module 308 may be varied according to the design criteria of a particular implementation.

The AI metering control module 320 may be configured to receive the statistics signal 3A_STAT and the timestamp signal TS generated by the IDSP 304 and the modified timestamp signal TS', the frame number signal FN and the signal LROI from the ROI detection module 306. The AI metering control module 320 may be configured to receive the signal KNEE, the signal TLN and/or the signal MWT. The signal KNEE, the signal TLN and/or the signal MWT may be user defined settings. In an example, one or more of the signal KNEE, the signal TLN and/or the signal MWT may be provided by the signal USER from the HID 166. In another example, the signal KNEE, the signal TLN and/or the signal MWT may be stored in the memory 150. The AI metering control module 320 may be configured to communicate a signal (e.g., HTS) and a signal (e.g., HLROI) with the track list queue 324. The AI metering control module 320 may be configured to generate a signal (e.g., CLUMA). The signal CLUMA may be presented to the AE control module 322.

The signal TLN may comprise a track loop number. The signal KNEE may comprise a weight value that balances the exposure between bright and dark. The signal MWT may comprise a metering weight table. The metering weight table may define the weight value for each tile (e.g., subarea) of the video frames 302a-302n. The signal TLN, the signal KNEE and/or the signal MWT may comprise initial settings for the AI metering control module 320.

The AI metering control module 320 may be configured to evaluate a current luma value for one of the video frames 302a-302n in response to the inputs received. For example, the current luma value may be calculated in response to the timestamp of one of the video frames 302a-302n, the updated timestamp TS' of one of the video frames 302a-302n, the 3A statistics (e.g., the tile luma values), and the list of regions of interest. In addition, the AI metering control module 320 may further evaluate the current luma value based on the exposure weight value, the track loop number and/or the metering weight table. The signal CLUMA may comprise the current luma value calculated by the AI metering control module 320.

The AI metering control module 320 may be configured to determine a mode of operation for performing the AI metering in response to the signal HTS and/or the signal HLROI. The signal HLROI may comprise a historical list of region of interest information (e.g., prior history of regions of interest) generated by the ROI detection module 306 (e.g., derived from the data provided in the signal LROI). The signal HTS may comprise a historical timestamp for the entries in the historical list of ROI information.

The AE control module 322 may be configured to receive the signal CLUMA and the signal TLUMA. The signal TLUMA may comprise a target luma value. The AE control module 322 may be configured to generate the signal AE_PARAM. The signal AE_PARAM may be presented to the capture device 104 in response to the signal CLUMA and/or the signal TLUMA.

The AE control module 322 may be configured to generate the AE parameters for the image sensor 180. The AE control module 322 may be configured to compare the current luma value from the signal CLUMA to the target luma value from the signal TLUMA. In response to the comparison between the signal TLUMA and the signal CLUMA, the AE control module 322 may calculate the AE parameters (e.g., shutter, automatic gain control (AGC), iris, etc.). For example, the shutter time, the AGC and/or the DC iris value may be adjusted to enable the current luma to reach the target luma. The target luma value in the signal TLUMA may be a user configurable value. In one example, the signal TLUMA may be provided by the signal USER from the HID 166. In another example, the signal TLUMA may be provided by the memory 150.

The 3A module 308 may be configured to perform 3A techniques. The 3A techniques performed by the AI metering control module 320 and the AE control module 322 of the 3A module 308 may be performed independently from the computer vision operations performed by the CNN module 190b (e.g., the computer vision AI model implemented by the ROI detection module 306). For example, the 3A techniques performed by the 3A module 308 may be executed in parallel with the computer vision operations performed by the ROI detection module 306. In one example, the ROI detection module may generate the ROI information by analyzing the YUV image of the video frames 302a-302n while the AI metering control module 320 analyzes the tile luma values from the 3A statistics of the video frames 302a-302n. The communication between the ROI detection module 306 and the 3A module 308 may be implemented by an inter-process communication technique. For example, the inter-process communication technique may comprise message queue, socket, shared memory, etc. The IDSP 304 and the 3A module 308 may communicate via shared memory. In an example, the shared memory for the IDSP 304 and the 3A module 308 may be the shared memory 206 of the processor 102. The data may be synced and fetched by interrupts.

The track list queue 324 may be configured to store historical data about the computer vision results generated by the ROI detection module 306. The track list queue 324 may be configured to communicate the historical region of interest list signal HLROI and the historical timestamp signal HTS with the AI metering control module 320. For example, the data communicated in the historical region of interest list signal HLROI and the historical timestamp signal HTS may comprise the historical computer vision results. The track list queue 324 may be configured as a memory queue (e.g., the track list queue 324 may comprise logic for tracking the ROIs).

The ROI detection module 306 may provide the computer vision results (e.g., the region of interest list signal LROI and the updated timestamp signal TS') to the AI metering control module 320. The AI metering control module 320 may push the new computer vision results to the track list queue 324 as the historical computer vision results. For example, the AI metering control module 320 may generate the historical region of interest list signal HLROI in response to the region of interest list signal LROI and the historical timestamp signal HTS in response to the updated timestamp signal TS'. When new data (e.g., in the historical ROI list signal HLROI and the updated timestamp signal HTS) is pushed from the AI metering control module 320 to the track list queue 324, the oldest data stored in the track list queue 324 may be pushed out. The track list queue 324 may have a pre-defined capacity of N recent computer vision results. In an example, if the track list queue has a capacity equal to three, then the track list queue 324 may cache the last three sets of historical data (e.g., historical data A may be stored first, then historical data B, then historical data C and when a new computer vision result, historical data D is received, the historical data A may be flushed and the historical data D may be stored). The historical data stored in the track list queue 324 may be used by the AI metering control module 320 for predictions (e.g., for cubic and/or quadratic fitting techniques) and/or for selecting which AI metering technique to use.

The implementation of the AI metering technique performed by the AI metering control module 320 may be one of three different implementations selected based on the computer vision results provided by the list of regions of interest in the signal LROI. For example, a different implementation branch may be performed for the AI metering depending on whether there is no current computer vision result with no history, no current computer vision result with history and/or a current computer vision result.

If the signal LROI indicates that there is no computer vision result received in the latest track loop number of the video frames 302a-302n (e.g., based on the track loop number signal TLN), the AI metering control module 320 may operate in a mode of operation that provides a metering strategy for the entire field of view (FOV) of the current video frame. All of the tiles (e.g., subareas) may be taken into account for the current luma calculation. The current luma value CLUMA may be a weighted average luma of the entire image. The calculation for the weighted average luma of the entire input may be determined based on the signal KNEE (e.g., the weight value to prioritize exposure on dark areas or bright areas), the signal MWT (e.g., the metering weight table that provides the weight value for each tile) and the signal 3A_STAT (e.g., the luma value for each tile).

In the mode of operation that implements the metering strategy for the entire FOV, the current luma calculation may comprise two steps. A first step may scale the tile luma by the value (e.g., from −1.0 to 1.0) according to the signal KNEE. The AI metering control module 320 may traverse the luma value for all of the tiles in the 3A statistics data. If the 3A statistics indicate that the tile luma is less than 2048, the value may be scaled by 1+KNEE. If the 3A statistics indicate that the tile luma is greater than or equal to 2048, the value may be scaled by 1−KNEE. The second step may be to calculate the weighted average luma. After determining the tile luma and the tile weight, the weighted tile luma may be calculated by an equation EQ1:

Weighted tile luma=tile luma×tile weight          EQ1:

The final equation for the weighted average luma (e.g., to be communicated by the signal CLUMA) may be calculated by EQ2. The value N in the equation EQ2 may be the maximum tile number.

$$\text{Weighted Average Luma} = \frac{\sum_{i=0}^{N-1}(TileLuma)i \times (TileWeight)i}{\sum_{i=0}^{N-1}(TileWeight)i} \quad \text{EQ 2}$$

If the signal LROI indicates that there is no current computer vision result in the current one of the video frames 302a-302n, but there is some historical computer vision results within the last track loop number of the video frames, the AI metering control module 320 may operate in a mode of operation that provides a metering strategy that uses a previous luma value. The AI metering control module 320 may use the same luma value from the previous track loop of the video frames 302a-302n as the current luma value CLUMA.

The AE control for the current one of the frames 302a-302n may not be changed when there is no current computer vision result but there does exist some historical information. For example, the AI metering control module 320 may operate under an assumption that the result of the computer vision operations performed by the ROI detection module 306 is delayed (e.g., the computer vision results may still be processing the data) and the data may be expected to arrive in the next track loop number of the video frames 302a-302n. If the computer vision result is still not received, then the AI metering control module 320 may change the mode of operation to the mode of operation that provides a metering strategy for the entire FOV (e.g., as if there is no history). In an example, when there is no current computer vision result but there is some previous history in the track loop, the scenario may be that the objects/subjects have moved out from the FOV, and the computer vision operations no longer detect any interesting subjects (e.g., the objects/subjects may subsequently return and the same calculation may be suitable).

The track loop number signal TLN may be a user input to the AI metering control module 320. The track loop number set by the signal TLN may be a threshold value for a number of video frames configured to indicate when the AI metering control module 320 may switch from the ROI metering mode of operation to the full FOV metering mode. The track loop number may indicate a unit of time equal to one frame time of the video frames 302a-302n. In an example, if the signal TLN provides a threshold often, then the AI metering control module 320 may switch from the mode of operation that uses ROI metering based on the historical information (e.g., the historical ROI list stored in the track list queue 324) to the full FOV metering mode of operation if the AI metering control module 320 does not receive a computer vision result from the ROI detection module 306 in the last ten consecutive video frames 302a-302n.

Setting the track loop number using the signal TLN may prevent constantly switching modes of operation. For example, a very low track loop number (e.g., a value of one) may result in changing to the full FOV metering mode of operation whenever there is any computer vision result delay or any communication failure. Switching between the modes of operation (e.g., changing frequently between ROI metering using the historical data and the full FOV metering mode) may result in unstable AE control (e.g., flicking due to continually changing AE parameters selected using the different modes of operation). Generally, the signal TLN may be selected to be a track loop number value that is longer than an amount of time for the ROI detection module 306 to perform the computer vision on one of the video frames 302a-302n.

In an example, the AI metering control module 320 may receive the 3A statistics corresponding to the frame number of one of the video frames 302a-302n. If the AI metering control module 320 does not receive a computer vision result for the particular video frame, then the AI metering control module 320 may check the track list queue 324 for any historical information. The AI metering control module 320 may receive the signal HTS and compare whether any of the computer vision results stored in the track list queue 324 are within the last track loop number of video frames. If one of the computer vision results stored in the track list queue has the historical timestamp HTS within the last track loop number of the video frames, then the AI metering control module 320 may select the ROI tracking mode of operation using the historical data (e.g., the previous current luma value may be presented as the signal CLUMA). If none of the historical data has the historical timestamp HTS within the last track loop number of video frames, then the AI metering control module 320 may select the full FOV metering mode of operation.

If the signal LROI indicates that there is a current computer vision result in the current one of the video frames 302a-302n, the AI metering control module 320 may operate in a mode of operation that provides a metering strategy that uses ROI tracking. The calculation of the current luma value CLUMA may prioritize the ROI areas indicated by the signal LROI. The current luma value CLUMA may be calculated to ensure that the ROI areas get optimal exposure.

The AI metering control module 320 may analyze the information about each of the ROIs in the list of ROIs provided in the signal LROI. The AI metering control module 320 may operate on the ROI information iteratively and repeat the same operations for each set of ROI information in the ROI list. After performing the operations on one set of ROI information, the AI metering control module 320 may analyze the next set of ROI information. When the end of the ROI list is reached, the AI metering control module 320 may exit the loop and then perform the weighted average calculation using the tile luma values in the signal 3A_STAT and the evaluated ROI information.

The AI metering control module 320 may perform ROI prediction. The ROI prediction may be performed in response to a difference between the timestamp in the signal TS and the updated timestamp in the signal TS'. Since the calculation time of the computer vision operations performed by the ROI detection module 306 may vary, the time when the signal LROI with the computer vision results is reported to the AI metering control module 320 may not necessarily be in real-time. The updated timestamp TS' for the current computer vision result may not be the same as the timestamp TS corresponding to the current 3A statistics data in the signal 3A_STAT. If the timestamp difference (e.g., TS−TS') is equal to zero, the AI metering control module 320 may skip the ROI prediction. If the timestamp difference is not equal to zero, then the AI metering control module 320 may perform the ROI prediction.

The AI metering control module 320 may determine the ROI prediction based on the historical ROI information stored in the track list queue 324. In an example, the AI metering control module 320 may be configured to calculate one or more fitting functions based on historical points. After applying the current time (e.g., the timestamp TS) in the fitting functions, the AI metering control module 320 may perform the ROI prediction by estimating the real-time ROI position.

After the real-time ROI position is calculated, the AI metering control module 320 may compare the coordinates of the real-time ROI with the coordinates of each tile in one of the video frames 302a-302n. For example, the subareas/tiles of the video frames 302a-302n may be classified as an ROI tile, an intersection tile and/or a background tile. Details of the classification of the various tiles/subareas of the video frames 302a-302n may be described in association with FIG. 7.

After all tiles are classified, the AI metering control module 320 may calculate an average luma value for each tile class. If the ROI is too small to wrap a single tile, then the AI metering control module 320 may skip the average luma value calculation for the small ROI (e.g., the luma for the small ROI may not be generated). If none of the ROIs have a valid ROI tile, then the AI metering control module 320 may consider the current computer vision result as invalid. If there is an invalid computer vision result, then the AI metering control module 320 may change modes of operation to the full FOV calculation (e.g., no computer vision result with no history) or the historical value mode of operation.

In response to processing all of the ROI information in the ROI list, the AI metering control module 320 may calculate the weighted average luma. The weighted average luma calculation may be determined based on an average luma of ROI tiles, the average luma of background tiles and the ROI weights. The weighted average luma value calculation may be used to generate the signal CLUMA comprising the weighted average luma on ROI tiles and the background tiles. Other factors may also be used to determine the signal CLUMA. In an example, a correctness of the weighted average luma value calculation may depend on the movement speed of the ROIs in the ROI list. Generally, the faster the movement of the ROIs, the less accurate the weighted average luma value calculated may be. The AI metering control module 320 may further generate the signal CLUMA in response to the information in the track list queue 324, the signal 3A_STAT and the signal LROI in order to generate the signal CLUMA from the weighted average luma value and the original luma value. The signal CLUMA comprising the weighted average luma and/or the original luma value may be provided to the AE control module 322. After generating the signal CLUMA, the AE control module 322 may update the historical computer vision results in the track list queue 324. In an example, the track list queue 324 may maintain the latest three computer vision results.

Figure 6:
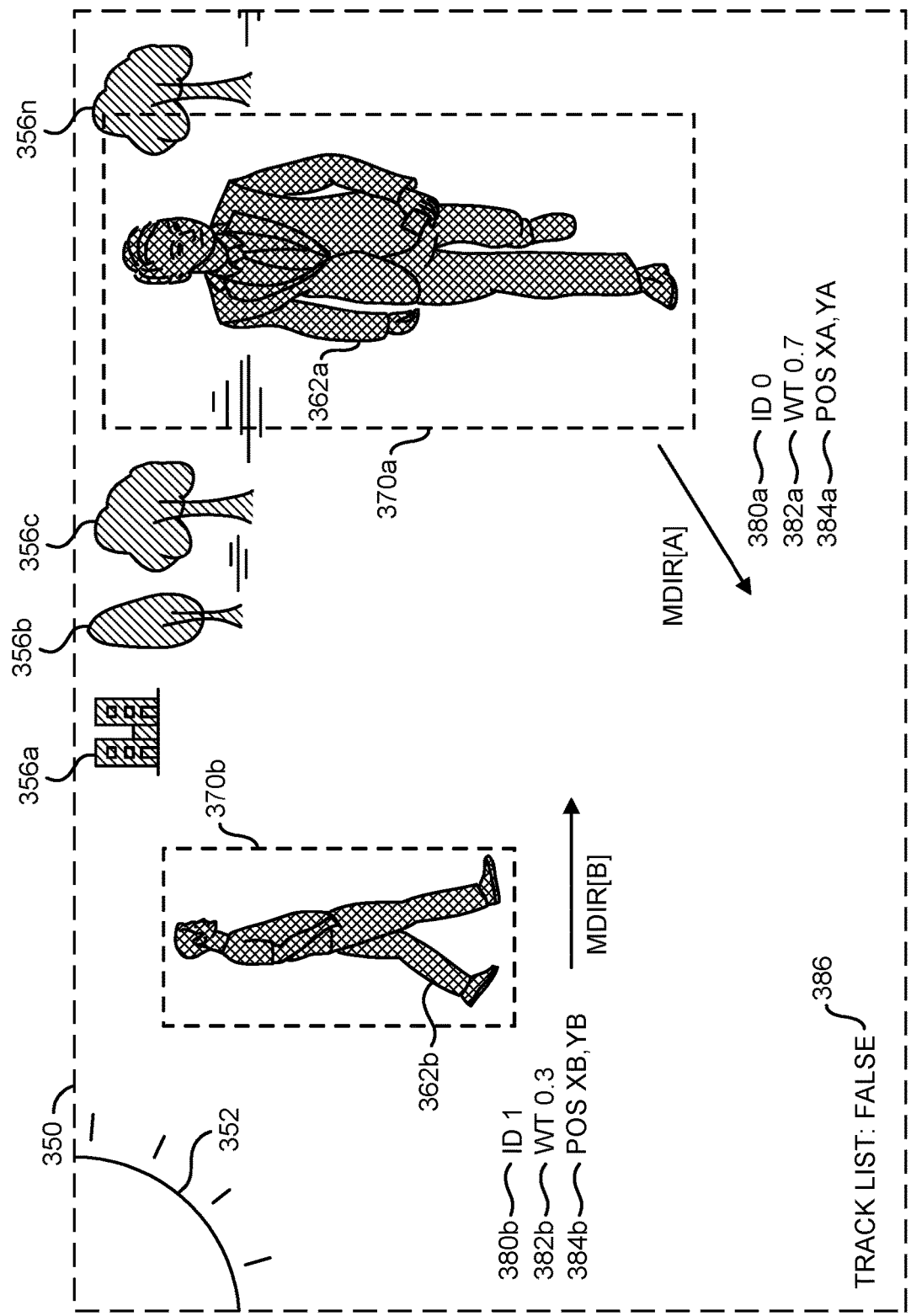
FIG. 6 is a diagram illustrating object detection and tracking in an example video frame before AI exposure metering is applied.

Referring to FIG. 6, a diagram illustrating object detection and tracking in an example video frame before AI exposure metering is applied is shown. An example video frame 350 is shown. The example video frame 350 may be a YUV image provided to the ROI detection module 306 in the signal YUV. The example video frame 350 may be an illustrative example of one video frame of a sequence of the video frames 302a-302n analyzed/evaluated by the processor 102. In the example shown, the example video frame 350 may correspond to a time when the computer vision ROI detection and/or analyze has been performed by the ROI detection module 306, but the AI metering has not yet been processed by the AI metering control module 320.

The example video frame 350 may comprise pixel data arranged as a video frame provided to the CNN module 190b. The CNN module 190b may be configured to analyze the pixel data of the video frame 350 to detect a size and/or location of various types of objects/subjects captured in the video frame 350. In an example, the computer vision AI model implemented by the ROI detection module 306 may be configured to detect various objects in the example video frame 350. The example video frame 350 may comprise a RGB image.

The example video frame 350 may be a video frame captured of an outdoor area (e.g., a view from the camera system 100 implementing the capture device 104). In one example, the example video frame 350 may be a video frame captured outdoors by a smartphone camera. In another example, the example video frame 350 may be a video captured by a smart doorbell and/or a home security camera. In the example shown, the example video frame 350 may be a video captured by a camera configured to focus on detecting pedestrians. The use-case for capturing and analyzing the example video frame 350 may be varied according to the design criteria of a particular implementation.

The example video frame 350 may comprise the sun 352, a number of background objects 356a-356n, and people 362a-362b. The sun 352 may be emitting light that may be captured by the sensor 180. The sunlight may cause areas of the example video frame 350 to be very bright or cast shadows on some areas of the example video frame 350. The background object 356a may be a building and the background objects 356b-356n may be trees. Generally, the background objects 356a-356n may not be objects of interest that the computer vision operations of the ROI detection module 306 may detect as an ROI in the ROI list. The people 362a-362b may be objects of interest that the computer vision operations of the ROI detection module 306 may detect as an ROI in the ROI list. The person 362a is shown closer to the image sensor 180 than the person 362b and as a result appears larger. The person 362a may be walking towards the lens 160. The person 362b is shown farther away from the image sensor 180 than the person 362a and may appear smaller. The person 362b is shown walking across the field of view of the lens 160 (e.g., not moving closer to or farther away from the lens 160).

Dotted shapes 370a-370b are shown. The dotted shapes 370a-370b may represent the detection of an object/subject by the computer vision operations performed by the processor 102. The dotted shapes 370a-370b may each comprise the pixel data corresponding to an object detected by the computer vision operations pipeline and/or the CNN module 190b. In the example shown, the dotted shapes 370a-370b may be detected in response to pedestrian detection operations performed by the computer vision operations pipeline and/or the CNN module 190b (e.g., the computer vision AI model implemented by the ROI detection module 306). The dotted shapes 370a-370b are shown for illustrative purposes. In an example, the dotted shapes 370a-370b may be visual representations of the object detection (e.g., the dotted shapes 370a-370b may not appear on an output video frame). In another example, the dotted shapes 370a-370b may be a bounding box generated by the processor 102 displayed on the output video frames to indicate that an object has been detected (e.g., the bounding boxes 370a-370b may be displayed in a debug mode of operation).

The computer vision operations may be configured to detect characteristics of the detected objects, behavior of the objects detected, a movement direction of the objects detected and/or a liveness of the objects detected. The characteristics of the objects may comprise a height, length, width, slope, an arc length, a color, an amount of light emitted, detected text on the object, a path of movement, a speed of movement, a direction of movement, a proximity to other objects, etc. The characteristics of the detected object may comprise a status of the object (e.g., opened, closed, on, off, etc.). The behavior and/or liveness may be determined in response to the type of object and/or the characteristics of the objects detected. While one example video frame 350 is shown, the behavior, movement direction and/or liveness of an object may be determined by analyzing a sequence of the video frames 302a-302n captured over time. For example, a path of movement and/or speed of movement characteristic may be used to determine that an object classified as a person may be walking or running. The types of characteristics and/or behaviors detected may be varied according to the design criteria of a particular implementation.

In the example shown, the bounding box 370a may be the region of interest of the large person 362a and the bounding box 370b may be the region of interest of the small person 362b. In an example, the settings (e.g., the feature set) for the processor 102 (e.g., the computer vision AI model implemented by the ROI detection module 306) may define objects of interest to be people and/or faces. For example, trees, plants, decorations, furniture, vehicles and/or buildings may not be objects of interest for a feature set defined to detect people and/or faces. In the example shown, the bounding boxes 370a-370b are shown having a square (or rectangular) shape. In some embodiments, the shape of the bounding boxes 370a-370b that correspond to the pedestrians detected may be formed to follow the shape of the body and/or the shape of the face of the people 362a-362b (e.g., an irregular shape that follows the curves of the faces and/or the body shape of the people 362a-362b).

The processor 102 and/or the CNN module 190b may be configured to implement pedestrian and/or face detection techniques. In some embodiments, the processor 102 and/or the CNN module 190b may detect other types of subjects as objects of interest (e.g., animals, vehicles, moving objects, falling objects, etc.). The computer vision techniques may be performed on the YUV image provided to the ROI detection module 306 by the IDSP 304.

The computer vision techniques may be configured to detect the ROIs and/or generate the information about the ROIs that correspond to the subjects 362a-362b. For example, the bounding boxes 370a-370b may be a visual representation of the ROIs detected. The processor 102 may loop the computer vision technique (e.g., iteratively perform object/subject detection throughout the example video frame 350) in order to determine if any objects of interest (e.g., as defined by the feature set) are within the field of view of the lens 160 and/or the image sensor 180. In the example shown, by iteratively performing the ROI detection technique, the processor 102 may detect the pedestrian 362a within the ROI 370a and the pedestrian 362b within the ROI 370b.

While only the pedestrians 362a-362b are shown as the ROIs 370a-370b, the computer vision operations performed by the processor 102 and/or the CNN module 190b may be configured to detect the background objects 356a-356n. The background objects 356a-356n may be detected for other computer vision purposes (e.g., training data, labeling, depth detection, etc.), but may not be used for the purposes of the AI metering technique performed by the apparatus 100. The ROI subject(s) may not be limited to person detection, as shown in the example video frame 350. The type(s) of subjects identified for the ROIs 370a-370b may be varied according to the design criteria of a particular implementation.

An arrow MDT R[A] and an arrow MDIR[B] are shown. The arrow MDIR[A] may extend in a direction from the ROI 370a. The arrow MDIR[B] may extend in a direction from the ROI 370b. The arrows MDIR[A]-MDIR[B] may provide a visual representation of the direction of movement of the objects (e.g., the pedestrians 362a-362b) within the ROIs 370a-370b. The movement arrows MDIR[A]-MDIR[B] are shown for illustrative purposes. In an example, the movement arrows MDIR[A]-MDIR[B] may be visual representations of the movement of the ROIs (e.g., the movement arrows MDIR[A]-MDIR[B] may not appear on an output video frame). In another example, the movement arrows MDIR[A]-MDIR[B] may be visual indication generated by the processor 102 displayed on the output video frames to indicate that the movement of the ROIs 370a-370b has been detected and/or tracked (e.g., the movement arrows MDIR[A]-MDIR[B] may be displayed in a debug mode of operation).

The movement arrow MDIR[A] may indicate that the person 362a may be moving in a direction towards the lens 160. For example, over the sequence of the video frames 302a-302n, the person 362a may become larger and occupy more of the tiles of the video frames 302a-302n (e.g., as the person 362a moves closer). The movement arrow MDIR[B] may indicate that the person 362b may be moving in a direction across the lens 160 from left to right. For example, over the sequence of the video frames 302a-302n, the person 362b may stay the same size and occupy the same amount of tiles of the video frames 302a-302n but the tiles occupied may change as the person 362b moves.

The processor 102 (e.g., the CNN module 190b implementing the ROI detection module 306) may determine whether any objects/subjects are present in the video frames analyzed. In the example video frame 350, the objects of interest may be the pedestrians 362a-362b. If a pedestrian has been captured in the video frame 350, the ROI detection module 306 may record a size of the objects and an offset (e.g., a location with respect to the edges of the video frame 350) of the object in order to define the ROIs 370a-370b. The ROI detection module 306 may further generate the ROI information for the ROIs 370a-370b. In the example shown, the processor 102 may detect the pedestrians 362a-362b. The processor 102 may store the information about the ROIs 370a-370b in the memory 150 and/or present the signal LROI comprising the ROI information to the 3A module 308.

The ROI detection module 306 may detect the ROIs 370a-370b. In the example shown, the ROI list may comprise the ROI 370a and the ROI 370b (e.g., two entries). ROI information 380a-384b is shown for the ROIs 370a-370b. The ROI information may comprise ROI IDs 380a-380b, ROI weights 382a-382b and ROI positions 384a-384b, each corresponding to the ROIs 370a-370b, respectively.

The ROI IDs 380a-380b may be a unique value to distinguish each of the ROIs 370a-370b. For example, the ROI IDs 380a-380b may be integer values. In the example shown, the ROI ID 380a may be zero for the ROI 370a and the ROI ID 380b may be one for the ROI 370b (e.g., any additional objects detected may be identified with a next incremental number). Other forms of identification may be used (e.g., a hash value, a letter value, user-provided name, etc.).

The ROI weights 382a-382b may indicate which of the ROIs 370a-370b have a higher AE priority. The computer vision operations may determine that the person 362a may have the higher priority than the person 362b for exposure (e.g., since the person 362a is closer to the capture device 104 and may occupy more space in the video frame 350). The ROI detection module 306 may determine that both the people 362a-362b should be well-exposed, but with more priority to the person 362a. In the example shown, the ROI weight 382a for the ROI 370a may be 0.7 and the ROI weight 382b for the ROI 370b may be 0.3 (e.g., totaling to 1.0 with the ROI 370a having more weight). In some embodiments, if the AI metering has not yet been applied, the people 362a-362b, the sun 352 and the background objects 356a-356n (e.g., the buildings, the trees, etc.) may be equally weighted and the entire FOV of the example video frame 350 may have the same weight value.

The ROI positions 384a-384b may comprise the x,y coordinates for the detected ROIs 370a-370b. In an example, the ROI position 384a for the ROI 370a may comprise the x,y coordinates (or offset) indicating that the ROI 370a is located on the right side and occupies most of the right side of the video frame 350. In another example, the ROI position 384b for the ROI 370b may comprise the x,y coordinates (or offset) indicating that the ROI 370b is located near the top left and occupies a relatively small portion of the video frame 350.

The ROI list and/or the ROI information may be presented to the 3A module 308 via the signal LROI. The ROI list and/or the ROI information may be stored in the track list queue 324. The example video frame 350 may be an example video frame captured without the AI metering applied. The ROI list and/or the ROI information may be used to enable the AI metering for upcoming video frames.

A track list indicator 386 is shown. The track list indicator 386 may comprise a 'false' value. The false value for the track list indicator 386 may indicate that there may not currently be any historical information in the track list queue 324. For example, the example video frame 350 may be a first in a sequence of the video frames 302a-302n.

In the example video frame 350, without the AI metering applied, the sun 352 is shown a bit overexposed, while the background objects 356a-356n may be slightly dim. The pedestrians 362a-362b detected by the computer vision AI may be very dark. For example, the pedestrians 362a-362b are shown shaded to indicate the poor exposure in the example video frame 350 without applying the AI metering technique. In one example, generating the video frames 302a-302n with the key objects (e.g., the pedestrians 362a-362b) very dark may prevent further analysis (e.g., post-processing, facial identification, etc.). In some embodiments, each of the pedestrians 362a-362b may be included in the metering calculation performed by the AI metering control module 320. In some embodiments, the computer vision operations performed by the ROI detection module 306 may only apply to specific (e.g., interested) people and exclude other people. For example, the interested people may be pre-defined familiar people that may be stored in the memory 150. In one example, the pedestrian 362a may be the interested person, which may be used for the ROI for the AI metering technique, while the pedestrian 362b may not be the interested person and may not be used for the ROI list for the AI metering technique. The AI metering technique may be configured to correct exposure and/or provide consistent exposure for the subjects defined by the ROIs 370a-370b.

Figure 7:
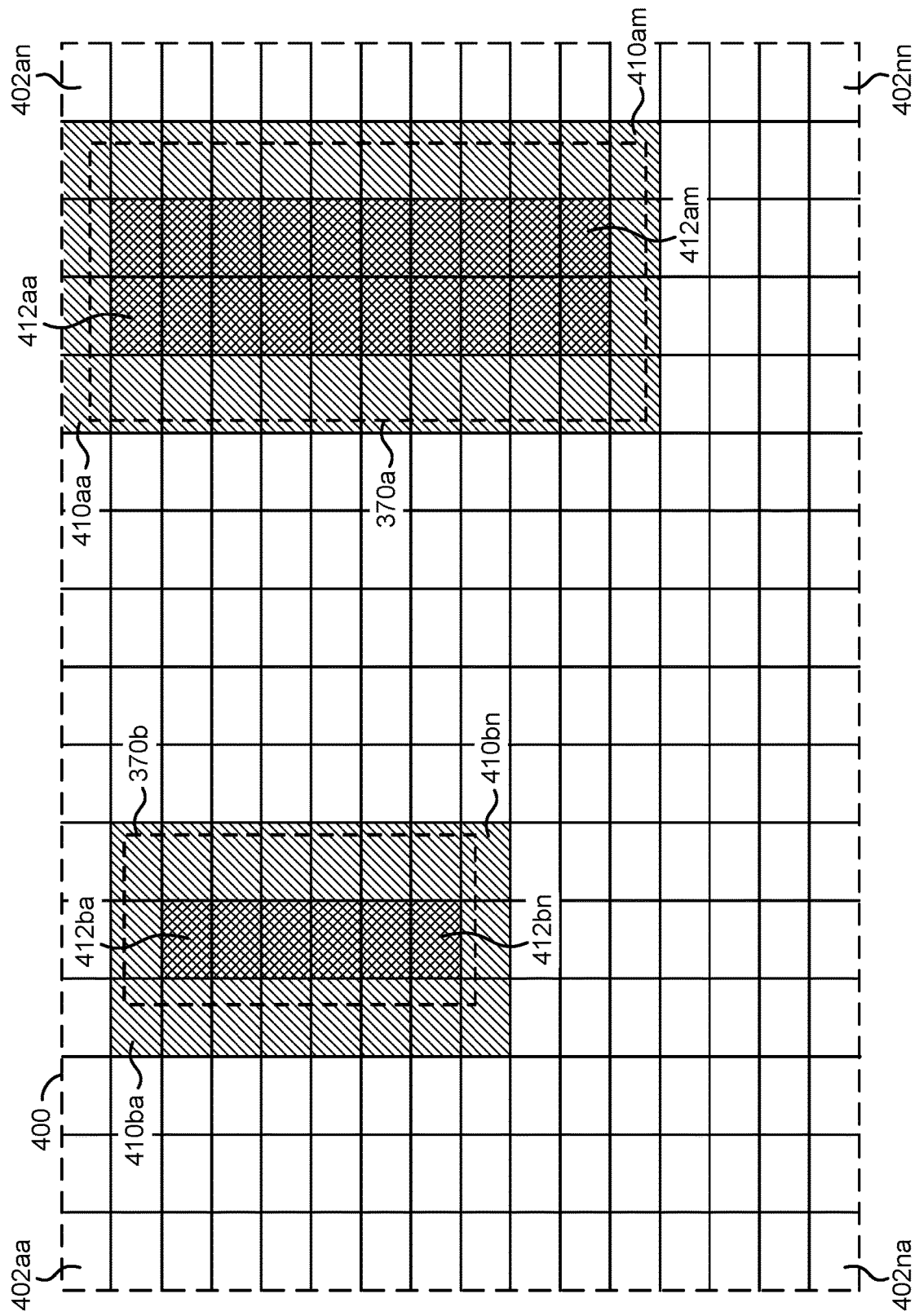
FIG. 7 is a diagram illustrating region of interest tile classification of an example video frame.

Referring to FIG. 7, a diagram illustrating region of interest tile classification of an example video frame is shown. The example video frame 400 is shown. The example video frame 400 may be a representation of the example video frames 302a-302n. In the example shown, the video frame 400 may be a version of the example video frame 350, shown in association with FIG. 6, that illustrates the tiles/subareas that may be classified by the AI metering control module 320. In the example shown, the example video frame 400 may correspond to a time when the AI metering control module 320 is performing the ROI metering control.

The AI metering control module 320 may receive the signal LROI comprising the ROI list and the ROI information. The ROIs 370a-370b are shown on the example video frame 400. In the example shown, the ROIs 370a-370b may correspond to the same locations as shown on the example video frame 350, shown in association with FIG. 6. The AI metering control module 320 may analyze the ROI information about the ROIs 370a-370b on the ROI list in order to determine the current luma value. Since the ROI list may comprise the two ROIs 370a-370b, the AI metering control module 320 may apply the AI metering technique that uses the ROI tracking mode of operation in order to calculate the current luma value.

The AI metering control module 320 may perform the analysis and/or calculations based on the ROI information in the ROI list and/or the tile luma values in the 3A statistics. Since the analysis may be performed on the ROI information, the analysis and/or calculations may be performed regardless of the types of objects/subjects detected. For example, the ROI detection module 306 may implement various computer vision AI modules to detect the ROI information. As long as the ROI information is provided, the AI metering control module 320 may perform the same analysis and/or calculations (e.g., the type of object may not matter).

The example video frame 400 is shown with a grid pattern overlaid. The grid pattern may comprise a number of tiles/subareas 402aa-402nn. Each of the tiles 402aa-402nn may have a tile luma value provided by the signal 3A_STAT generated by the IDSP 304. In the example shown, a first row of the grid pattern may comprise the tiles 402aa-402an, the second row of the grid pattern may comprise the tiles 402ba-402bn, the last row of the grid pattern may comprise the tiles 402na-402nn, etc. The grid pattern may comprise a n×n number of tiles. The number of rows and columns of the grid pattern of the tiles 402aa-402nn may be different values (e.g., a m×n grid). In the example shown, the grid pattern of the tiles 402aa-402nn may be a 16×16 granularity. In other embodiments, the granularity of the grid pattern of the tiles 402aa-402nn may be 12×8, 24×16, 32×32, etc. The granularity of the grid pattern of the tiles 402aa-402nn may be varied according to the design criteria of a particular implementation.

The AI metering control module 320 may be configured to classify each of the tiles 402aa-402nn. The tiles 402aa-402nn may be classified as either a ROI tile, an intersection tile or a background tile. Any of the tiles 402aa-402nn within one of the ROIs 370a-370b may be an ROI tile. Any of the tiles 402aa-402nn that comprises the border of the ROIs 370a-370b (e.g., intersects with the bounding box) may be an intersection tile. Any of the tiles 402aa-402nn that is outside of the ROIs 370a-370n may be a background tile.

The ROI 370a may comprise shaded tiles 410aa-410am and cross-hatched tiles 412aa-412am. The shaded tiles 410aa-410am may be the intersection tiles of the ROI 370a. The cross-hatched tiles 412aa-412am may be the ROI tiles of the ROI 370a. The ROI 370b may comprise shaded tiles 410ba-410bn and cross-hatched tiles 412ba-412bn. The shaded tiles 410ba-410bn may be the intersection tiles of the ROI 370b. The cross-hatched tiles 412ba-412bn may be the ROI tiles of the ROI 370b. The other of the tiles 402aa-402nn that are not shaded or cross-hatched may be the background tiles. In the example shown, the ROI 370a may comprise 20 of the ROI tiles 412aa-412am (e.g., 10×2) and 28 of the intersection tiles 410aa-410am and the ROI 370b may comprise 6 of the ROI tiles 412ba-412bn (e.g., 6×1) and 18 of the intersection tiles 410ba-410bn. The number of intersection tiles or the number of ROI tiles for each of the ROIs 370a-370b may be varied depending on the size of the ROIs 370a-370b.

Each of the tiles 402aa-402nn may correspond to a subarea of the YUV image. Each of the tiles 402aa-402nn may comprise a luma value of the particular subarea. The luma value may quantify a brightness of the subarea. For the ROI 370a, the ROI tiles 412aa-412am may be fully enclosed by the bounding box of the ROI 370a. Similarly, for the ROI 370b, the ROI tiles 412ba-412bn may be fully enclosed by the bounding box of the ROI 370b.

For the ROI 370a, the bounding box may pass through the intersection tiles 410aa-410am. Similarly, for the ROI 370b, the bounding box may pass through the intersection tiles 410ba-410bn. Since the intersection tiles 410aa-410am and/or the intersection tiles 410ba-410bn may comprise partial ROI luma and partial background luma, the luma value of the intersection tiles may not be accurate for reference. The AI metering control module 320 may not use the tiles 402aa-402nn classified as the intersection tiles in the current luma value calculations. If any of the ROIs 370a-370b do not comprise any of the ROI tiles, but only has the intersection tiles, the computer vision result for the ROI may be considered an invalid computer vision result. The invalid computer vision result may not be stored as part of the historical computer vision results in the track list queue 324.

The rest of the (unshaded) tiles 402aa-402nn may be the background tiles. The background tiles may not be intersected with or enclosed by either the ROI 370a or the ROI 370b. The background tiles may represent the luma values of the background of the YUV image.

The ROI tiles and the background tiles may be weighted for the current luma value calculation. The average luma value of the ROI tiles for each one of the ROIs 370a-370n may be calculated according to EQ3.

$$\text{Average Luma of } ROI \text{ tiles for } ROIn = \frac{Luma \sum ofROItilesforROIn}{NumberofROItilesforROIn} \quad EQ3$$

The average luma value of the background tiles may be calculated by the equation EQ4.

$$\text{Background Average Luma} = \frac{Luma \sum ofBackgroundTiles}{NumberofBackgroundTiles} \quad EQ4$$

The AI metering control module 320 may use the average luma value of each ROI ($ROI_{L_i}$), and the average luma of the background (BG_L) and ROI weights ($ROI_{W_i}$) to calculate the current luma value. The current luma value of the image may be calculated by the equation EQ5.

$$\text{Current Image Luma} = \sum_{i=0}^{N-1} ROI_{L_i} \times ROI_{W_i} + \text{BG\_L} \times \left(1.0 - \sum_{j=0}^{N-1} ROI_{W_j}\right) \quad EQ5$$

The value N may be the number of ROIs in the ROI list. For the example video frame 400, the value of N may be 2 (e.g., the ROIs 370a-370b). Other of the video frames 302a-302n may comprise other amounts of ROIs.

The current luma value may calculated by the AI metering control module 320 according to the equation EQ5. The current luma value calculated may be presented to the AE control module 322 via the signal CLUMA. The AE control module 322 may be configured to compare the current luma value to the target luma value in order to determine the AE parameters. The AE control module 322 may provide the updated AE parameters to the capture device 104 via the signal AE_PARAM. The signal AE_PARAM may enable the video frames 302a-302n captured after the example video frame 350 to be generated with the consistent exposure for the objects/subjects detected.

Figure 8:
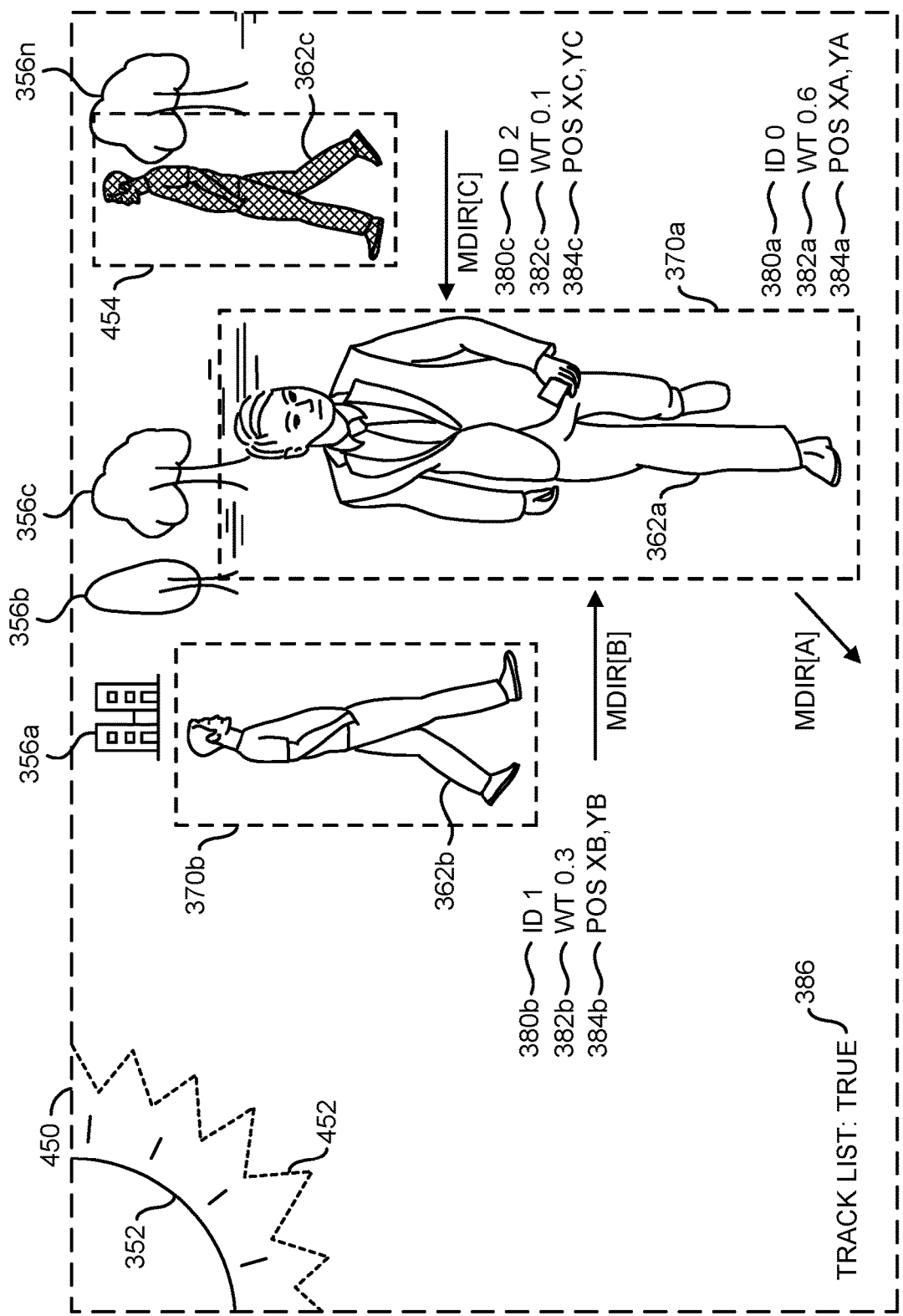
FIG. 8 is a diagram illustrating object detection and tracking in an example video frame after AI exposure metering is applied.

Referring to FIG. 8, a diagram illustrating object detection and tracking in an example video frame after AI exposure metering is applied is shown. An example adjusted video frame 450 is shown. The adjusted video frame 450 may comprise one of the video frames 302a-302n generated after the example video frame 350 shown in association with FIG. 6. For example, the example video frame 350 may have been generated and analyzed/evaluated by the dynamic AI metering components 300, the AI metering technique may have calculated the AE parameters in response to the example video frame 350, and after the capture device 104 has been adjusted according to the calculated AE parameters, the adjusted video frame 450 may have been captured. In the example shown, the adjusted video frame 450 may correspond to a time when the AI ROI metering control has taken effect and the AE becomes stable.

Since the adjusted video frame 450 may have been captured shortly after the example video frame 350, the adjusted video frame 450 may comprise similar content. The adjusted video frame 450 may comprise the sun 352, the background objects 356a-356n and the pedestrians 362a-362b. In the adjusted video frame 450, the pedestrians 362a-362b may have moved positions compared to the positions of the pedestrians 362a-362b in the example video frame 350. The movement arrows MDIR[A]-MDIR[B] are shown representing the direction of movement of the respective pedestrians 362a-362b. The ROIs 370a-370b corresponding to the pedestrians 362a-362b are shown. The background objects 356a-356n may be static and have not moved between video frames.

A flare effect 452 is shown. The flare effect 452 may be located around the sun 352. A pedestrian 362c is shown. The pedestrian 362c may have entered the field of view of the image sensor 180 after example video frame 350 (e.g., after the AE parameters have been calculated). A dotted box 454 is shown around the pedestrian 362c. The dotted box 454 may represent the bounding box for the ROI detected for the pedestrian 362c. The ROI 454 for the pedestrian 362c may be generated similar to the ROIs 370a-370b. An arrow (e.g., MDIR[C]) is shown. The arrow MDIR[C] may comprise a movement arrow indicating the direction of movement tracked for the pedestrian 362c.

In the adjusted video frame 450, the ROIs 370a-370b and the new ROI 454 may have the ROI information. The ROI 370a may have the same ROI ID 380a of zero, the ROI 370b may have the same ROI ID 380b of one and the new ROI 454 may have the next value for the ROI ID 380c of two.

The ROI detection module 306 may update the ROI weights 382a-382c while performing the computer vision operations in response to the new location/sizes of the detected objects and/or any new or missing objects. In the example shown, the ROI 370a with the largest size may have the highest ROI weight value 382a of 0.6, the next largest ROI 370b may have the next highest ROI weight value 382b of 0.3, while the new ROI 454 (e.g., not previously in the track list queue 324) may have the lowest ROI weight value 382c of 0.1. Generally, ROIs that were previously in the track list queue 324 may have higher weight values than new ROIs. The ROI weights 382a-382b may have been rebalanced to include the new ROI 454 while still providing a total weight value of 1.0.

In the example shown, the ROI position 384a for the ROI 370a may comprise the x,y coordinates (or offset) indicating that the ROI 370a is located in the bottom right and occupies a relatively larger portion of the adjusted video frame 450 compared to the previous example video frame 350. In the example shown, the ROI position 384b for the ROI 370b may comprise the x,y coordinates (or offset) indicating that the ROI 370b is located in the middle and occupies a similar portion of the adjusted video frame 450 compared to the previous example video frame 350. In the example shown, the ROI position 384c for the new ROI 454 may comprise the x,y coordinates (or offset) indicating that the ROI 454 is located in the top right and occupies a relatively small portion of the adjusted video frame 450.

The adjusted video frame 450 may be an example video frame captured with the AI metering applied. The track list indicator 386 is shown. The track list indicator 386 may comprise a 'true' value. The true value for the track list indicator 386 may indicate that there may currently be historical information in the track list queue 324. For example, the historical information for the example video frame 350 may be stored in the track list queue 324.

After the AI metering technique has been applied, the exposure of the adjusted video frame 450 may be consistent compared to the example video frame 350. In the adjusted video frame 450, the sun 352 may be highly overexposed. The flare effect 452 may provide an illustrative representation of the overexposure. In the adjusted video frame 450, the background objects 356a-356n may be slightly overexposed (e.g., compared to being slightly dim in the example video frame 350).

After the AI metering technique has been applied, the objects/subjects (e.g., the pedestrians 362a-362b) may be well exposed. In the example shown, the pedestrians 362a-362b are shown without shading to indicate the consistent exposure (e.g., compared to the shading shown in the example video frame 350). Since the pedestrians 362a-362b are well exposed in the adjusted video frame 450, the video data corresponding to the pedestrians 362a-362b may be suitable for further analysis purposes (e.g., facial identification, post-processing, depth analysis, etc.). The AI metering technique may be capable of generating the well-exposed objects in even more challenging scenarios. For example, if one of the pedestrians 362a-362b were located under a roof (e.g., with shade), there may be a greater exposure ratio between the ROI for the pedestrians 362a-362b and the background. Even with a large exposure ratio the AI metering technique may be configured to generate the AE parameters to enable well-exposed objects of interest.

In the adjusted video frame 450, the new pedestrian 362c is shown shaded. Since the new pedestrian 362c may have entered the field of view of the image sensor 180 after the AE parameters were generated, the new pedestrian 362c may not be well exposed yet. In the example shown, the new pedestrian 362c is shown dark, but may alternatively be overexposed depending on the previous AE parameters for the particular location. For example, the new pedestrian 362c may not be well-exposed until the ROI detection module 306 analyzes the information about the ROI 454 and the AI metering control module 320 analyzes the updated ROI list and recalculates the current luma values based on the updated ROI information. In the adjusted video frame 450, the new pedestrian 362c may have a different luma than the other two pedestrians 362a-362b (e.g., that have already been included in the AI metering areas).

After the analysis of the adjusted video frame 450, the new pedestrian 362c may be involved in the AI metering calculation. The weighted average luma value may be changed when the current luma value is calculated for the adjusted video frame 450. The AE parameters may be updated by the AE control module 322 and the next of the video frames 302a-302n may be further adjusted and the exposure for all of the pedestrians 362a-362c may be adjusted. For example, the exposure for the previously metered pedestrians 362a-362b may be slightly adjusted and the exposure for the new pedestrian 362c may have a large adjustment to ensure consistent exposure for all of the objects of interest.

The calculation time for the computer vision operations may vary depending on the implementation of the computer vision operations. Since the timing may vary, the updated timestamp TS' for the ROI list may not be the same as the timestamp TS for the 3A statistics data. If the two timestamps are different, then the computer vision results may not be synchronous with the current 3A statistics data. The AI metering control module 320 may be configured to perform prediction on the current ROI information in order to compensate for the lack of synchronous data.

The prediction operations may start from the starting point of the ROI and the prediction for the end point of the ROI may follow the same procedure. In order to perform the prediction operations, the AI metering control module 320 may rely on historical ROI data. For example, the track list queue 324 may store the previous three computer vision results. The prediction operations may comprise different steps according to the availability of the historical data.

If the ROI ID is new (e.g., the ROI 454 for the new pedestrian 362c), then there may not be any historical data. When there is no historical data, the prediction may be skipped. The ROI information at the updated timestamp TS' may be used to calculate the luma for the ROI at the timestamp TS. Since there may be a mismatch between the updated timestamp TS' and the timestamp TS the luma calculation for the new ROI 454 may comprise some inaccuracies. However, as long as the movement of the new pedestrian 362c is not fast enough to move out from the previous ROI within the time difference (e.g., TS-TS'), then the real-time position of the new pedestrian 362c may still have some overlapped area ROI position from the updated timestamp TS'. The calculated luma value may be accurate to some extent, so the luma result will be used. The accuracy of the prediction when no historical data is available may be dependent on the movement speed of the object(s). Generally, even when the movement speed is high enough that the prediction of the ROI is inaccurate, the prediction used may still provide more consistent exposure than if AI metering is not used.

When there is one ROI ID that has historical information (e.g., the ROI 370a) for the ROI position and one new current ROI position for the ROI 370a, the prediction may be configured to calculate a linear fitting function regarding x,y (x and y coordinates of the ROI start points) and a time t. For example, the ROI 370a may have coordinates x1,y1 at a timestamp t1 and the new position coordinates for the ROI 370a may have the coordinates x2,y2 at a timestamp t2. The AI metering control module 320 may calculate the fitting function based on the known values of x1, x2, t1 and t2. The coefficients of a and b in a first function EQ6 may be calculated with two sets of data, (x1, t1) and (x2, t2). Coefficients of c and d in the second function EQ7 may be calculated by (y1, t1) and (y2, t2).

$$x = a \times t + b \qquad \text{EQ6:}$$

$$y = c \times t + d \qquad \text{EQ7:}$$

After the AI metering control module 320 generates the fitting functions, the current time TS may be applied to the fitting functions in order to predict the start point of the ROIs.

When the same ROI ID (e.g., the ROI 370a) has two historical data points (e.g., ROI position) at a time T1 and a time T2 and one new ROI position at a time T3, the prediction operations may calculate a quadratic fitting function for the current x,y coordinates with the time t. Coefficients of a, b and c for a first function EQ8 may be calculated using the known three sets of data (x1, t1), (x2, t2) and (x3, t3). Coefficients of d, e and f for a second function EQ9 may be calculated by (y1, t1), (y2, t2), (y3, t3).

$$x = a \times t^2 + b \times t + c \qquad \text{EQ8:}$$

$$y = d \times t^2 + e \times t + f \qquad \text{EQ9:}$$

After the AI metering control module 320 generates the fitting functions, the current time TS may be applied to the fitting functions in order to predict the start point of the ROI 370a.

For scenarios with more than two historical data points, the prediction operations may be configured to predict the ROI position points based on a cubic fitting function. However, the costs of calculation time and memory storage may increase. Using cubic fitting may comprise a tradeoff between time, space and accuracy. Whether cubic fitting function is used by the AI metering control module 320 may depends on user preferences. For example, a user may use the HID 166 to provide the signal USER to enable/disable cubic fitting. Generally, if the quadratic fitting function provides sufficient accuracy, then the system may use the latest two historical data and the new data using the equation EQ8 and the equation EQ9 in order to predict the point on the quadratic fitting function.

Figure 9:
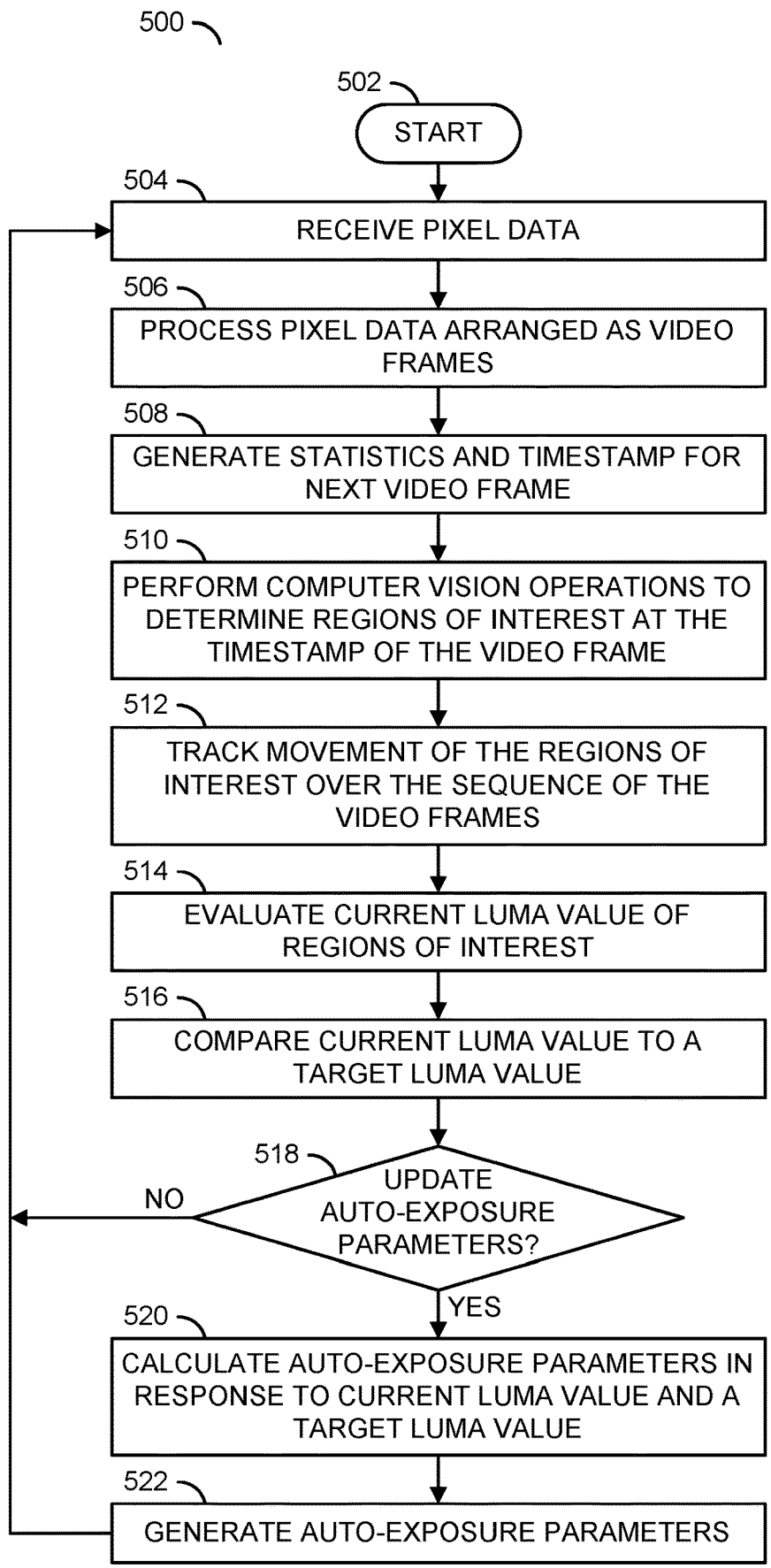
FIG. 9 is a flow diagram illustrating a method for implementing automatic exposure metering for regions of interest that tracks moving subjects using artificial intelligence.

Referring to FIG. 9, a method (or process) 500 is shown. The method 500 may implement automatic exposure metering for regions of interest that tracks moving subjects using artificial intelligence. The method 500 generally comprises a step (or state) 502, a step (or state) 504, a step (or state) 506, a step (or state) 508, a step (or state) 510, a step (or state) 512, a step (or state) 514, a step (or state) 516, a decision step (or state) 518, a step (or state) 520, and a step (or state) 522.

The step 502 may start the method 500. In the step 504, the processor 102 may receive the pixel data. In an example, the capture device 104 may generate the pixel data in response to the light input signal LIN and generate the signal VIDEO comprising the pixel data. Next, in the step 506, the processor 102 may perform video processing operations to process the pixel data arranged as the video frames 302a-302n. In the step 508, the IDSP 304 of the processor 102 may be configured to generate statistics and a timestamp for the next one of the video frames 302a-302n. In an example, the statistics may comprise the 3A statistics, which may be presented to the 3A module 308 via the signal 3A_STAT and the timestamp may be a timestamp corresponding to the one of the video frames 302a-302n and may be communicated to the 3A module 308 and the ROI detection module 306. Next, the method 500 may move to the step 510.

In the step 510, the processor 102 may perform the computer vision operations to determine the regions of interest at the timestamp of the video frame being analyzed. In an example, the ROI detection module 306 (e.g., a component of the CNN module 190b) may detect the regions of interest that correspond to desired objects/events and generate the region of interest list LROI at a time corresponding to the updated timestamp signal TS'. Next, in the step 512, the ROI detection module 306 and the 3A statistics module 310 may track the movement of the ROIs over the sequence of the video frames 302a-302n. For example, the historical ROI information may be stored in the track list queue 324 via the historical timestamp HTS and the historical ROI information list HLROI as the ROI detection module 306 detects the ROIs and updates the ROI positions 384a-384c that correspond to the respective ROI IDs 380a-380c. In the step 514, the processor 102 may evaluate a current luma value of the ROIs. In an example, the AI metering control module 320 may receive the ROI information from the signal LROI, the knee value in the signal KNEE, the metering weight table in the signal MWT, the historical ROI list information in the signal HLROI, the 3A statistics in the signal 3A_STAT to evaluate the current luma value. Next, in the step 516, the processor 102 may compare the current luma value to a target luma value. In an example, the AE control module 322 may compare the current luma value in the signal CLUMA with the target luma value in the signal TLUMA. Next, the method 500 may move to the decision step 518.

In the decision step 518, the processor 102 may determine whether to update the AE parameters. In an example, the AE parameters may be updated to adjust the current luma value to match the target luma value. For example, if the current luma value is already at the target luma value, updating the AE parameters may not be beneficial. If no update is determined for the AE parameters, then the method 500 may return to the step 504 (e.g., to evaluate a next one of the video frames 302a-302n). If an update is determined for the AE parameters, then the method 500 may move to the step 520. In the step 520, the processor 102 may calculate the AE parameters in response to the current luma value and the target luma value. For example, the AE parameters may be calculated in order to align the current luma value with the target luma value. Next, in the step 522, the processor 102 may generate the AE parameters. For example, the AE control module 322 may present the signal AE_PARAM to the capture device 104 (e.g., to adjust a DC iris, a shutter time, an AGC, etc.). Next, the method 500 may return to the step 504 (e.g., to evaluate a next one of the video frames 302a-302n).

Figure 10:
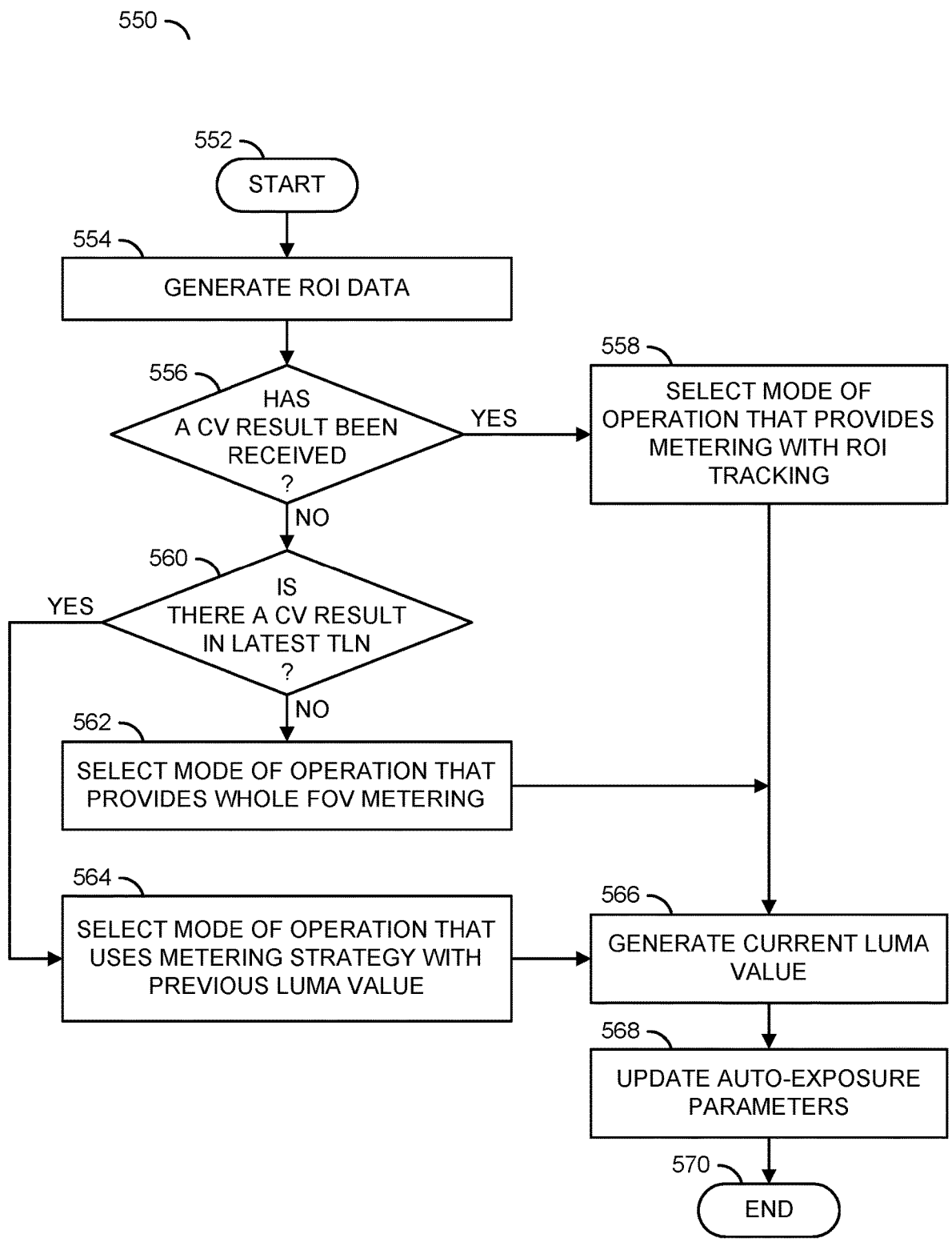
FIG. 10 is a flow diagram illustrating a method for selecting an auto-exposure metering technique.

Referring to FIG. 10, a method (or process) 550 is shown. The method 550 may select an auto-exposure metering technique. The method 550 generally comprises a step (or state) 552, a step (or state) 554, a decision step (or state) 556, a step (or state) 558, a decision step (or state) 560, a step (or state) 562, a step (or state) 564, a step (or state) 566, a step (or state) 568, and a step (or state) 570.

The step 552 may start the method 550. In the step 554, the ROI detection module 306 may generate ROI information. For example, if a computer vision result is detected, the ROI detection module 306 may generate the signal LROI to update the ROI information. Next, in the decision step 556, the AI metering control module 320 may determine whether a computer vision result has been received. For example, the AI metering control module 320 may determine whether the ROI detection module 306 has provided computer vision results for the latest of the video frames 302a-302n. If the AI metering control module 320 has determined that a computer vision result has been received, then the method 550 may move to the step 558. In the step 558, the AI metering control module 320 may select the mode of operation for generating the AE parameters that provides AI metering with the ROI tracking. Next, the method 550 may move to the step 566. In the decision step 556, if the AI metering control module 320 has determined that no computer vision result has been received, then the method 550 may move to the decision step 560.

In the decision step 560, the AI metering control module 320 may determine whether there is a computer vision result in the latest track loop number. In an example, the AI metering control module 320 may receive the historical timestamp signal HTS to determine if any of the historical information in the track list queue 324 is from one of the video frames 302a-302n within the length of the track list number provided by the signal TLN. If there is no historical information for the computer vision results within the track loop number, then the method 550 may move to the step 562. In the step 562, the AI metering control module 320 may select the mode of operation for generating the AE parameters that provides whole FOV metering. Next, the method 550 may move to the step 566. In the decision step 560, if there is historical information for the computer vision results within the track loop number, then the method 550 may move to the step 564. In the step 564, the AI metering control module 320 may select the mode of operation for generating the AE parameters that uses a metering strategy with the previous luma value. Next, the method 550 may move to the step 566.

In the step 566, the AI metering control module 320 may generate the current luma value CLUMA. Next, in the step 568, the AE control module 322 may update the AE parameters. The signal AE_PARAM may be communicated to the capture device 104. Next, the method 550 may move to the step 570. The step 570 may end the method 550.

Figure 11:
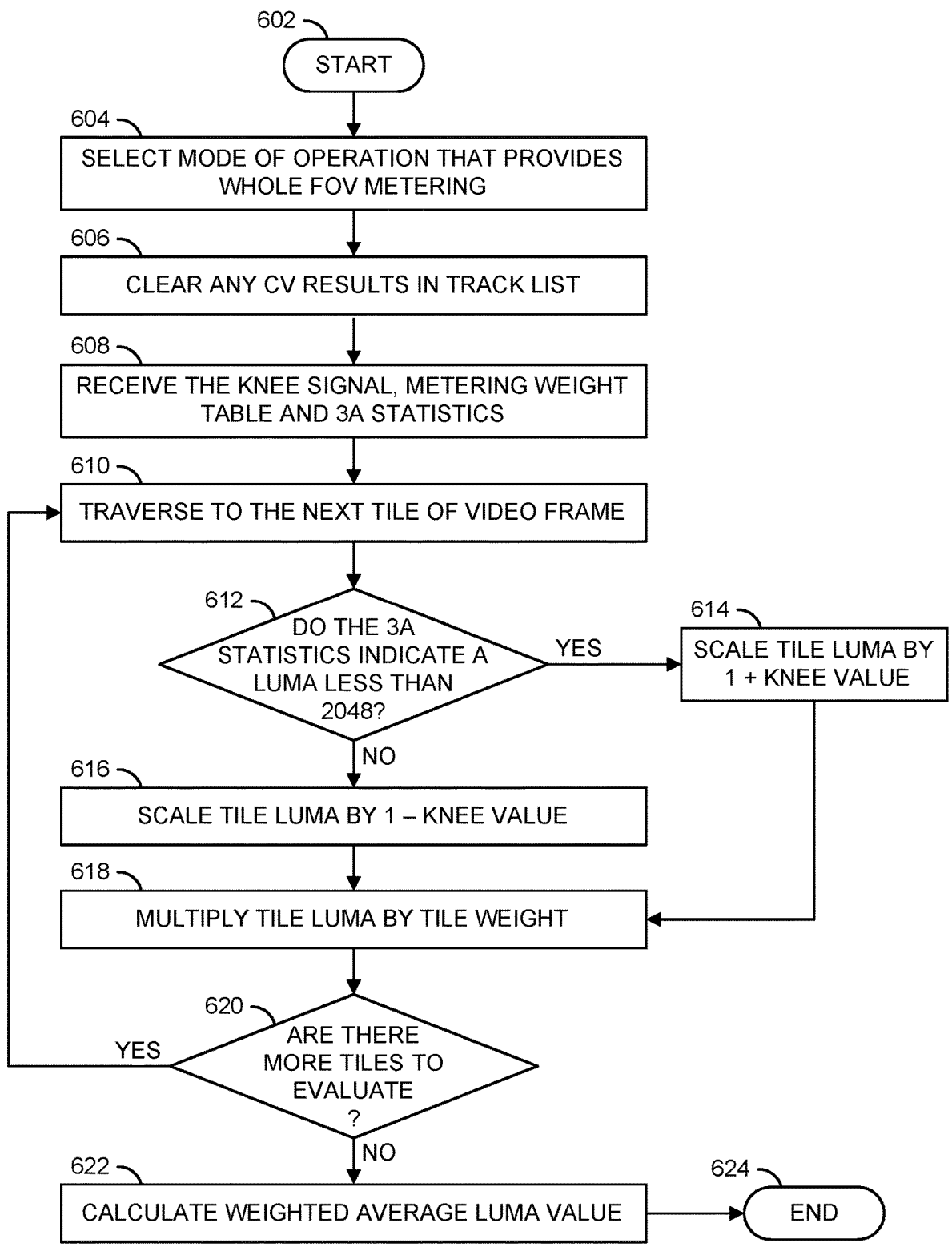
FIG. 11 is a flow diagram illustrating a method for selecting auto-exposure parameters using a full field of view metering.

Referring to FIG. 11, a method (or process) 600 is shown. The method 600 may select auto-exposure parameters using a full field of view metering. The method 600 generally comprises a step (or state) 602, a step (or state) 604, a step (or state) 606, a step (or state) 608, a step (or state) 610, a decision step (or state) 612, a step (or state) 614, a step (or state) 616, a step (or state) 618, a decision step (or state) 620, a step (or state) 622, and a step (or state) 624.

The step 602 may start the method 600. In the step 604, the AI metering control module 320 may select the mode of operation that provides whole FOV metering. Next, in the step 606, the track list queue 324 may clear any computer vision results in the track list queue 324 (e.g., all results stored may be outside the track loop number and may no longer be relevant for the incoming video frames 302a-302n). In the step 608, the AI metering control module 320 may receive the knee signal KNEE (e.g., a user input), the metering weight table signal MWT (a user input and/or stored in the memory 150) and/or the 3A statistics signal 3A_STAT (e.g., from the IDSP 304). Next, in the step 610, the AI metering control module 320 may traverse to the next one of the tiles 402aa-402nn in one of the video frames 320a-320n. Next, the method 600 may move to the decision step 612.

In the decision step 612, the AI metering control module 320 may determine whether the 3A statistics indicate that the current one of the tiles 402aa-402nn has a luma value of less than 2048. If the luma value is less than 2048, then the method 600 may move to the step 614. In the step 614, the AI metering control module 320 may scale the tile luma value by a value of 1+ the knee value. Next, the method 600 may move to the step 618. In the decision step 612, if the luma value is greater than or equal to 2048, then the method 600 may move to the step 616. In the step 616, the AI metering control module 320 may scale the tile luma value by a value of 1−knee value. Next, the method 600 may move to the step 618.

In the step 618, the AI metering control module 320 may multiply the tile luma by the tile weight (e.g., from the metering weight table). Next, the method 600 may move to the decision step 620. In the decision step 620, the AI metering control module 320 may determine whether there are more of the tiles 402aa-402nn in the current one of the video frames 302a-302n to evaluate. If there are more tiles to evaluate, then the method 600 may return to the step 610. If there are no more tiles to evaluate, then the method 600 may move to the step 622. In the step 622, the AI metering control module 320 may calculate the average weighted luma value. Next, the method 600 may move to the step 624. The step 624 may end the method 600.

Figure 12:
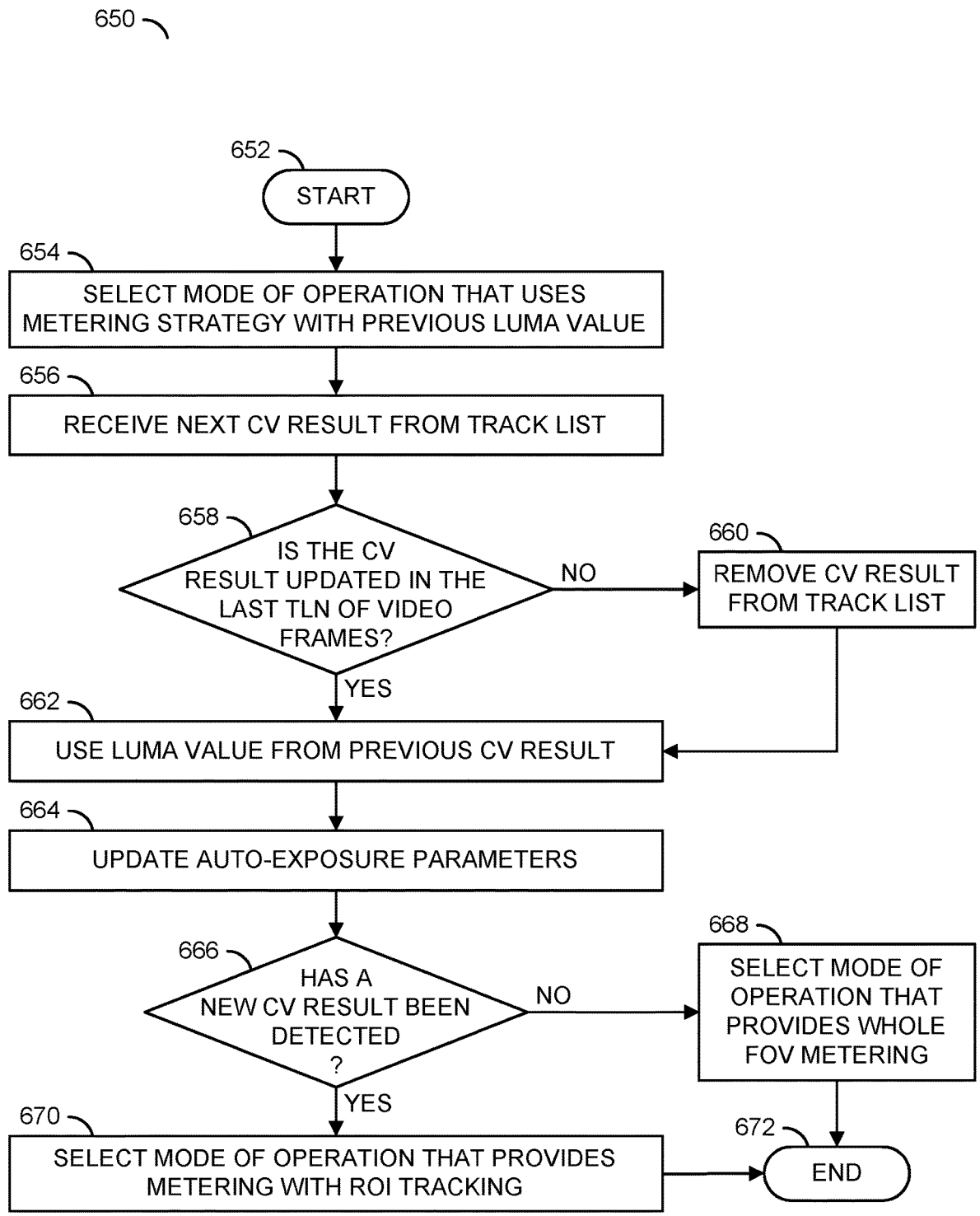
FIG. 12 is a flow diagram illustrating a method for selecting auto-exposure parameters using a previous luma value without current computer vision results.

Referring to FIG. 12, a method (or process) 650 is shown. The method 650 may select auto-exposure parameters using a previous luma value without current computer vision results. The method 650 generally comprises a step (or state) 652, a step (or state) 654, a step (or state) 656, a decision step (or state) 658, a step (or state) 660, a step (or state) 662, a step (or state) 664, a decision step (or state) 666, a step (or state) 668, a step (or state) 670, and a step (or state) 672.

The step 652 may start the method 650. In the step 654, the AI metering control module 320 may select the mode of operation that uses the metering strategy with the previous luma value. For example, no computer vision result may be available for the current one of the video frames 302*a*-302*n*. Next, in the step 656, the AI metering control module 320 may receive the next computer vision result from the track list queue 324 (e.g., the historical ROI information list signal HLROI). Next, the method 650 may move to the decision step 658.

In the decision step 658, the AI metering control module 320 may determine whether the computer vision result has been updated in the last track loop number of the video frames 302*a*-302*n*. If there has been no new computer vision result, then the method 650 may move to the step 660. In the step 660, the computer vision results may be removed from the track list queue 324. For example, the track list queue 324 may be updated when there are no new computer vision results. Next, the method 650 may move to the step 662. In the decision step 658, if there is a computer vision result updated in the last track loop number of the video frames 302*a*-302*n*, then the method 650 may move to the step 662.

In the step 662, the AI metering control module 320 may use the luma value from the previous computer vision result (e.g., to present as the signal CLUMA). For example, the luma value from the ROI information in the signal HLROI that has the most resent historical timestamp from the signal HTS may be used. Next, in the step 664, the AE control module 322 may re-use the previous luma result as the current luma value to compare with the target luma value in order to generate the AE parameters for the capture device 104. Next, the method 650 may move to the decision step 666.

In the decision step 666, the AI metering control module 320 may determine whether a new computer vision result has been detected. In an example, the AI metering control module 320 may determine whether new ROI information has been provided in the signal LROI. If no new computer vision results have been received, then the method 650 may move to the step 668. In the step 668, the AI metering control module 320 may change to the mode of operation that provides the whole FOV metering. Next, the method 650 may move to the step 672. In the decision step 666, if there has been a new computer vision result detected, then the method 650 may move to the step 670. In the step 670, the AI metering control module 320 may change to the mode of operation that provides the AI metering with ROI tracking. Next, the method 650 may move to the step 672. The step 672 may end the method 650.

Figure 13:
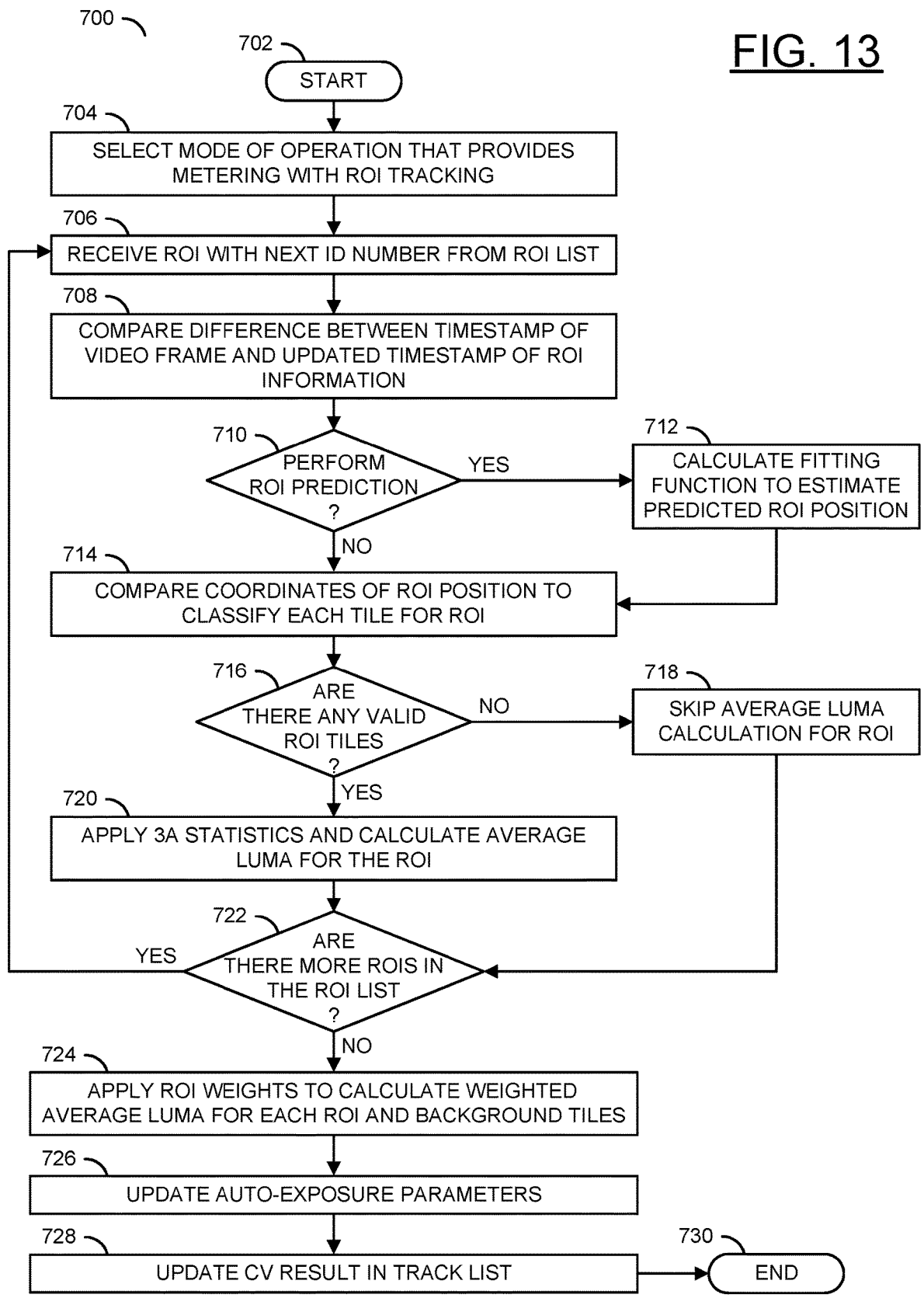
FIG. 13 is a flow diagram illustrating a method for selecting auto-exposure parameters using region of interest tracking.

Referring to FIG. 13, a method (or process) 700 is shown. The method 700 may select auto-exposure parameters using region of interest tracking. The method 700 generally comprises a step (or state) 702, a step (or state) 704, a step (or state) 706, a step (or state) 708, a decision step (or state) 710, a step (or state) 712, a step (or state) 714, a decision step (or state) 716, a step (or state) 718, a step (or state) 720, a decision step (or state) 722, a step (or state) 724, a step (or state) 726, a step (or state) 728, and a step (or state) 730.

The step 702 may start the method 700. In the step 704, the AI metering control module 320 may select the mode of operation that provides the AI metering with ROI tracking. Next, in the step 706, the AI metering control module 320 may receive the ROI information for one of the ROIs 370*a*-370*b* with the next one of the ROI IDs 380*a*-380*b*. In the step 708, the AI metering control module 320 may compare a difference between the timestamp TS of the current one of the video frames 302*a*-302*n* from the IDSP 304 and the updated timestamp TS' from the ROI detection module 306. Next, the method 700 may move to the decision step 710.

In the decision step 710, the AI metering control module 320 may determine whether to perform the ROI prediction. In an example, the ROI prediction may be performed when the timestamp TS and the updated timestamp TS' does not match. If the AI metering control module 320 is performing the ROI prediction, then the method 700 may move to the step 712. In the step 712, the AI metering control module 320 may calculate a fitting function to estimate the predicted ROI position based on the historical information stored in the track list queue 324. Next, the method 700 may move to the step 714. In the decision step 710, if the AI metering control module 320 is not performing the ROI prediction, then the method 700 may move to the step 714. In the step 714, the AI metering control module 320 may compare the coordinates of one of the ROI positions 384*a*-384*b* in order to classify each of the ROI tiles 412*aa*-412*am*. Next, the method 700 may move to the decision step 716.

In the decision step 716, the AI metering control module 320 may determine whether there are any valid ROI tiles. For example, if the ROI does not wrap around any of the tiles 402*aa*-402*nn* then there may not be any valid ROI tiles. If there are no valid ROI tiles, then the method 700 may move to the step 718. In the step 718, the AI metering control module 320 may skip the average luma calculation for the current one of the ROIs 370*a*-370*b*. Next, the method 700 may move to the decision step 722. In the decision step 716, if there are valid ROI tiles, then the method 700 may move to the step 720. In the step 720, the AI metering control module 320 may apply the 3A statistics and calculate the average luma for the ROI. Next, the method 700 may move to the decision step 722.

In the decision step 722, the AI metering control module 320 may determine whether there are more ROIs in the ROI list provided by the ROI detection module 306. If there are more ROIs, then the method 700 may return to the step 706 and repeat the steps 706-722 for the ROI with the next ROI ID. If there are no more ROIs, then the method 700 may move to the step 724. In the step 724, the AI metering control module 320 may apply the ROI weights 382*a*-382*b* to calculate the weighted average luma value for each of the ROIs 370*a*-370*b* and the background tiles. Next, in the step 726, the AE control module 322 may update the AE parameters for the capture device 102. In the step 728, the AI metering control module 320 may generate the historical timestamp signal HTS and the historical ROI information list signal HLROI to update the computer vision results in the track list queue 324. Next, the method 700 may move to the step 730. The step 730 may end the method 700.

The functions performed by the diagrams of FIGS. 1-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
    an interface configured to receive pixel data; and
    a processor configured to (i) process said pixel data arranged as video frames, (ii) generate statistics and a timestamp for said video frames, (iii) perform computer vision operations on said video frames to determine one or more regions of interest within said video frames at said timestamp, (iv) track a movement of said regions of interest over a sequence of said video frames, (v) evaluate a current luma value of said regions of interest, (vi) calculate auto-exposure parameters in response to said current luma value and a target luma value and (vii) generate an output signal comprising said auto-exposure parameters, wherein said auto-exposure parameters are calculated to
        (a) prioritize an exposure of said regions of interest in said video frames, and
        (b) dynamically change said auto-exposure parameters based on said movement of said regions of interest.

2. The apparatus according to claim 1, wherein dynamically changing said auto-exposure parameters enables said regions of interest in said video frames to have said exposure over said sequence of said video frames be insensitive to said current luma value changing as a result of light conditions.

3. The apparatus according to claim 1, wherein said statistics comprise information from said video frames about auto-white balance, auto-focus and auto-exposure.

4. The apparatus according to claim 1, wherein
    said computer vision operations are configured to generate information about a list of said regions of interest and a modified timestamp, and
    said modified timestamp comprises said timestamp plus an amount of time to perform said computer vision operations.

5. The apparatus according to claim 4, wherein each entry of said list of said regions of interest comprises a position, an identification value and a weight value.

6. The apparatus according to claim 5, wherein said computer vision operations are configured to track said movement of said regions of interest across said sequence of said video frames based on said identification value.

7. The apparatus according to claim 5, wherein said weight value
    comprises a value between 0.0 and 1.0, and
    provides a priority of said regions of interest for said auto-exposure parameters.

8. The apparatus according to claim 5, wherein said current luma value of said regions of interest is evaluated in response to said information about said regions of interest, said modified timestamp, said timestamp and said statistics.

9. The apparatus according to claim 8, wherein said current luma value of said regions of interest is further evaluated in response to
a track loop number,
a metering weight table, and
an initial settings weighting value for balancing said exposure between areas of said video frames.

10. The apparatus according to claim 4, wherein said processor is further configured to perform a prediction of a location of said regions of interest in response to determining that said timestamp and said modified timestamp do not match.

11. The apparatus according to claim 10, wherein said prediction of said location of said regions of interest is determined in response to a current position of said regions of interest at said modified timestamp and historical information about said regions of interest stored in a track list queue.

12. The apparatus according to claim 1, wherein said computer vision operations comprise one or more of person detection, vehicle detection, motion detection, and face detection.

13. The apparatus according to claim 1, wherein each of said regions of interest correspond to an object detected as defined by said computer vision operations.

14. The apparatus according to claim 1, wherein said output signal is provided to an image sensor of a capture device.

15. The apparatus according to claim 14, wherein said auto-exposure parameters comprise one or more of a shutter time, an iris value and an automatic gain control of said image sensor.

16. The apparatus according to claim 1, wherein said processor is configured to calculate said auto-exposure parameters for an entire field of view of said video frames in response to
said computer vision operations not detecting at least one of said regions of interest, and
having no prior history of said regions of interest.

17. The apparatus according to claim 1, wherein said processor is configured to re-use said current luma value from a previous one of said video frames in response to
said computer vision operations not detecting at least one of said regions of interest in a current one of said video frames, and
having a prior history of said regions of interest in said previous one of said video frames.

18. The apparatus according to claim 17, wherein said current luma value from said previous one of said video frames is used if said current luma value corresponds to said prior history of said regions of interest within a track loop number of said video frames.

19. The apparatus according to claim 17, wherein a predefined number of said prior history of said regions of interest is stored in a track list queue.

20. The apparatus according to claim 1, wherein said statistics comprise a table of tile luma values that corresponds to a plurality of tiles of said video frames.

* * * * *